Sept. 1, 1959 W. S. W. EDGAR, JR 2,902,538

DIAL FACSIMILE SYSTEM

Filed June 9, 1955 13 Sheets-Sheet 1

INVENTOR.
W. S. W. EDGAR, JR.

BY E R Hyde Jr.

ATTORNEY

Sept. 1, 1959 W. S. W. EDGAR, JR 2,902,538

DIAL FACSIMILE SYSTEM

Filed June 9, 1955 13 Sheets-Sheet 2

INVENTOR.
W. S. W. EDGAR, JR.

BY *E. R. Hyde Jr.*

ATTORNEY

INVENTOR.
W. S. W. EDGAR, JR.
BY E. R. Hyde Jr.
ATTORNEY

DIAL FACSIMILE SYSTEM

Filed June 9, 1955

13 Sheets-Sheet 4

INVENTOR.
W. S. W. EDGAR, JR.
BY E R Hyde Jr.
ATTORNEY

Sept. 1, 1959 W. S. W. EDGAR, JR 2,902,538

DIAL FACSIMILE SYSTEM

Filed June 9, 1955 13 Sheets-Sheet 5

INVENTOR.
W. S. W. EDGAR, JR.
BY E R Hyde Jr.
ATTORNEY

Sept. 1, 1959 W. S. W. EDGAR, JR 2,902,538

DIAL FACSIMILE SYSTEM

Filed June 9, 1955 13 Sheets-Sheet 6

INVENTOR.
W. S. W. EDGAR, JR.

BY E. R. Hyde Jr.

ATTORNEY

Sept. 1, 1959 W. S. W. EDGAR, JR 2,902,538

DIAL FACSIMILE SYSTEM

Filed June 9, 1955 13 Sheets-Sheet 7

INVENTOR.
W. S. W. EDGAR, JR.

BY E R Hyde Jr.

ATTORNEY

INVENTOR.
W. S. W. EDGAR, JR.
BY E. R. Hyde Jr.
ATTORNEY

INVENTOR.
W. S. W. EDGAR, JR.
BY [signature]
ATTORNEY

INVENTOR.
W. S. W. EDGAR, JR.
BY E R Hyde Jr
ATTORNEY

Sept. 1, 1959 W. S. W. EDGAR, JR 2,902,538

DIAL FACSIMILE SYSTEM

Filed June 9, 1955 13 Sheets-Sheet 11

INVENTOR.
W. S. W. EDGAR, JR.
BY E R Hyde Jr.
ATTORNEY

INVENTOR.
W. S. W. EDGAR, JR.
BY E R Hyde Jr.
ATTORNEY

Sept. 1, 1959 W. S. W. EDGAR, JR 2,902,538

DIAL FACSIMILE SYSTEM

Filed June 9, 1955 13 Sheets-Sheet 13

INVENTOR.
W. S. W. EDGAR, JR.

BY E. R. Hyde Jr.

ATTORNEY 2,902,538
Patented Sept. 1, 1959

2,902,538

DIAL FACSIMILE SYSTEM

William Stanley Westerman Edgar, Jr., New York, N.Y., assignor to The Western Union Telegraph Company, New York, N.Y., a corporation of New York Application June 9, 1955, Serial No. 514,236

13 Claims. (Cl. 178—2)

This invention relates to facsimile telegraphy and more particularly to a dial controlled switching arrangement for automatically interconnecting facsimile machines.

The present invention is especially adapted to be used with a local facsimile system of the type used by a subscriber company for the exchange of record communications between different points on the companies' premises. It is common practice for a business organization that has a substantial volume of record communications between different points within the organization to install facsimile machines at these points. In the present systems, each of the facsimile machines will connect with a central point on the subscriber's premises. In transmitting a message from one outstation to another outstation, the equipment now in general use requires that the message be first recorded at the central point and then retransmitted to its proper destination. The process of retransmission presents the disadvantages of being time consuming and requiring the services of an operator at the central point to inspect the message, determine the addressee outstation and make the connection for retransmission.

The present invention eliminates these disadvantages by providing dialing equipment at the outstations whereby the sending operator may dial the outstation to which he desires to transmit. Automatic switching equipment will then make the proper connection and the message may be transmitted directly to its proper station without being recorded and retransmitted at a central point. The invention further provides a master sending station that may simultaneously transmit to any number of the various outstations. If the subscriber company has need for record communications outside his system, a tie line may be provided with an outside public service telegraph communication system, such as that maintained by the Western Union Telegraph Company.

It is therefore a primary object of this invention to provide a dial controlled automatic switching system for facsimile machines whereby any pair of facsimile machines in a system may be interconnected by merely dialing the number of the addressee station.

A further object of the invention is to provide a facsimile dial switching system wherein busy tests will indicate to a sending operator the condition of a dialed station.

A further object of the present invention is to provide a dial controlled facsimile switching system that is simple of operation and wherein safeguards against operating failures are provided.

Another object of this invention is to provide a facsimile switching system including a plurality of facsimile stations, one of which is capable of simultaneously transmitting to any number of the other stations in the system.

Another object of this invention is to provide a dial controlled facsimile switching system including a tie line with an outside system whereby any of the transmitting stations in the said system may transmit directly to the outside system.

These and other objects of the invention will become apparent from the following description considered with the drawings, in which:

Fig. 1 is a schematic representation of a system employing the present invention;

Figs. 2, 3 and 4 together show the circuit arrangement of the common control switching equipment and the switching equipment associated with each outstation;

Figs. 5 and 6 taken together constitute a circuit diagram of an outstation transceiver;

Fig. 7 is a schematic diagram of a receiving-only station;

Figs. 8, 9, 10 and 11 together form a circuit diagram of the master transmission equipment;

Figures 1, 14, 15:
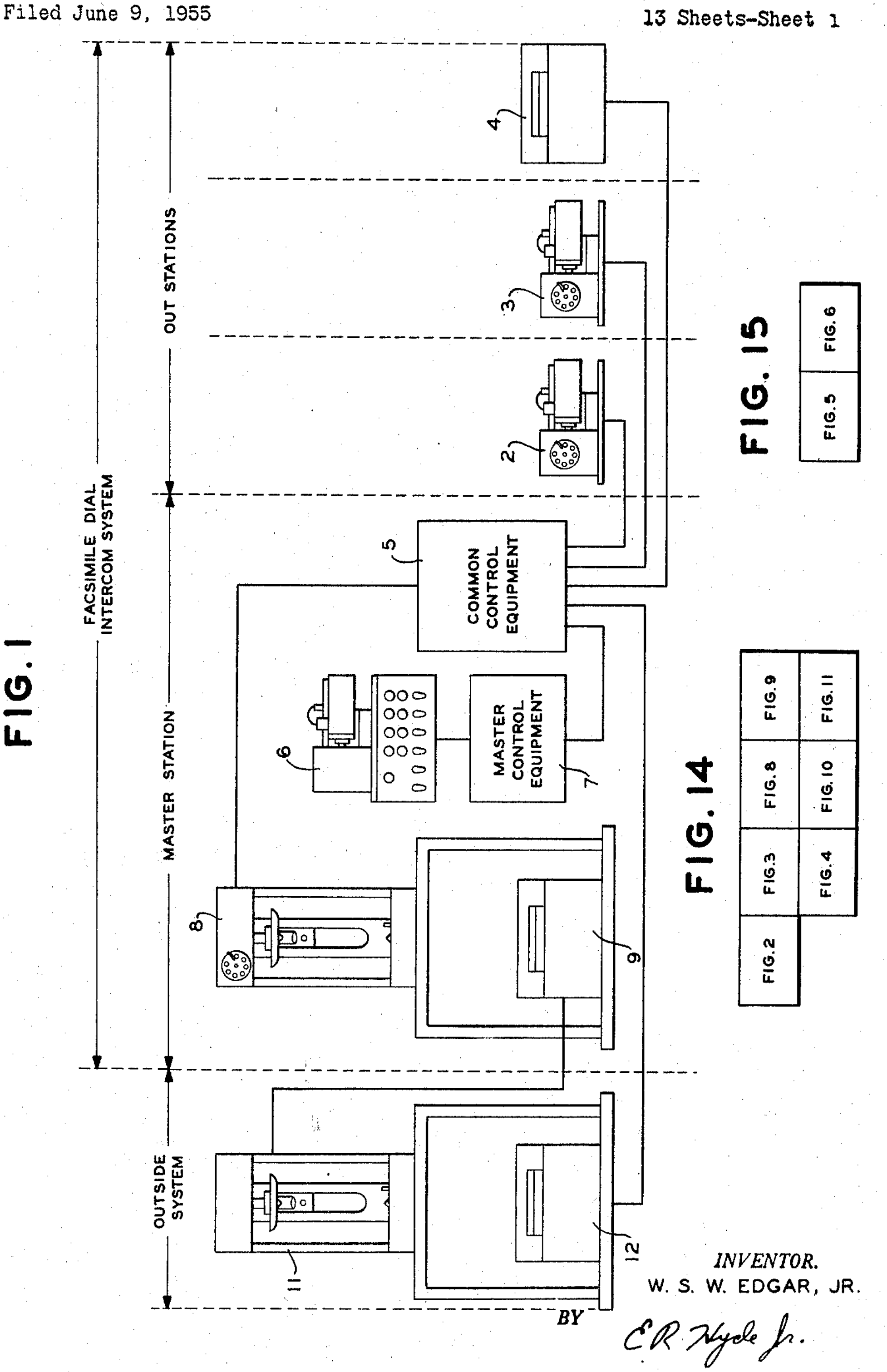

Referring now to Fig. 1, there is shown a system embodying the present dial control switching system. The subscriber has located about his premises a number of facsimile machines 2, 3 and 4. Machines 2 and 3 are of the type capable of both transmitting and receiving. There may be any convenient number of these machines located about the premises, two being shown for purposes of illustration. It may be that certain locations or offices have no need for transmitting messages to other points. These locations will therefore be equipped with a facsimile recorder rather than a transceiver. Numeral 4 represents such a receiving-only station. Each of these machines connects to common control switching equipment 5.

Provision is made for a master station with a transceiver and selecting unit 6 and master control equipment 7 which is capable of simultaneously transmitting to any number of the other outstations in the subscriber's system. This master control equipment is conveniently located with the common control switching equipment 5. If the subscriber's needs dictate, a tie-in with another communication system may be provided. In this case a transmitter 8 and a facsimile recorder 9 are located at the master station and connect with another transmitter 11 and recorder 12 in the outside system. Each of the out-stations 2 and 3 and the master station are equipped with dialing equipment so that any one may automatically connect with any one of the others merely by dialing the designated number of the addressee station. Dialing equipment is unnecessary at station 4 since this station is a receiving-only station. It is understood, of course, that any of the transceiver stations may selectively connect with the receiving-only station merely by dialing the number designated for that station.

*Transmission between two outstanding stations*

Figure 2:
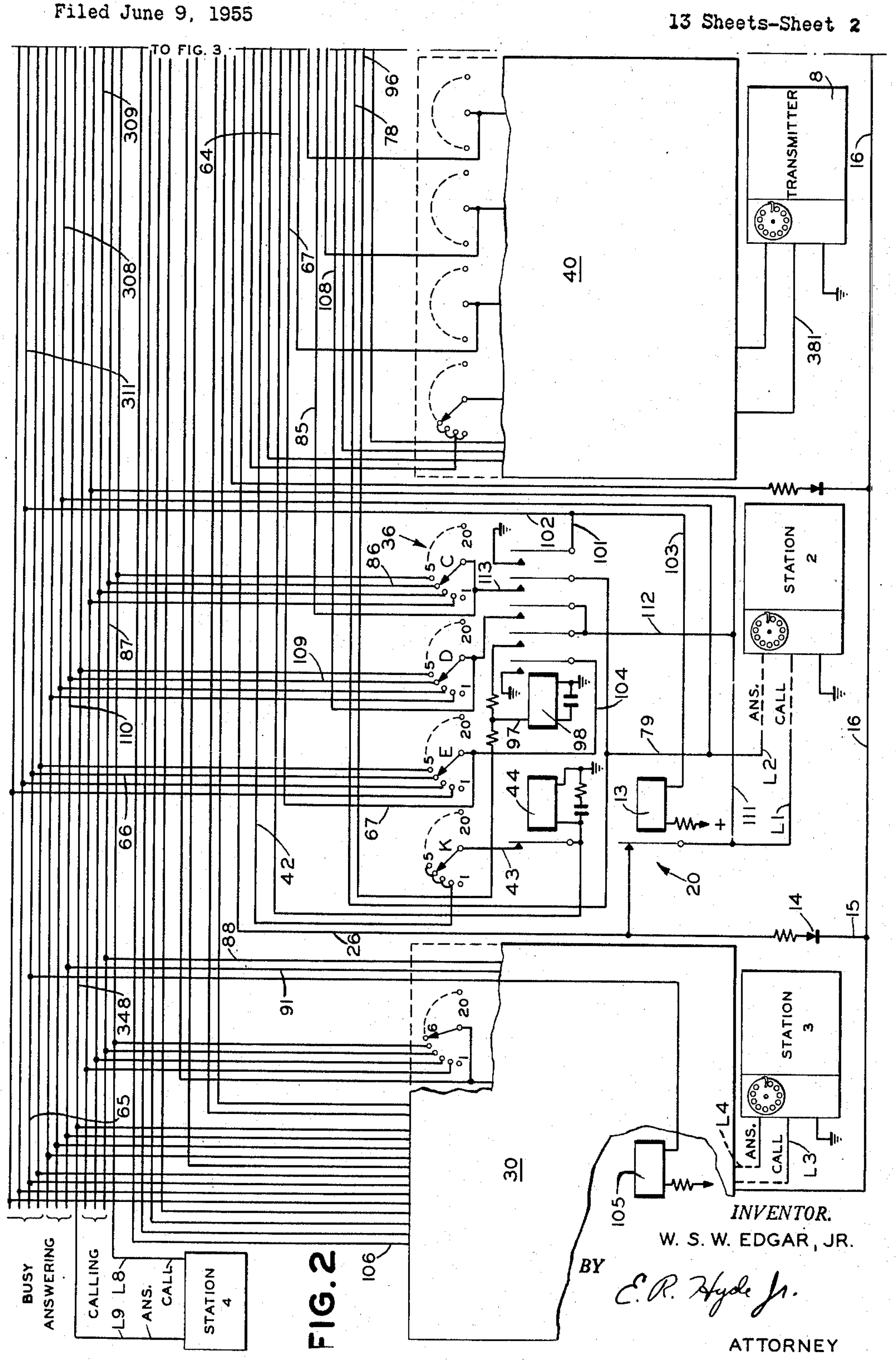
Figure 3:
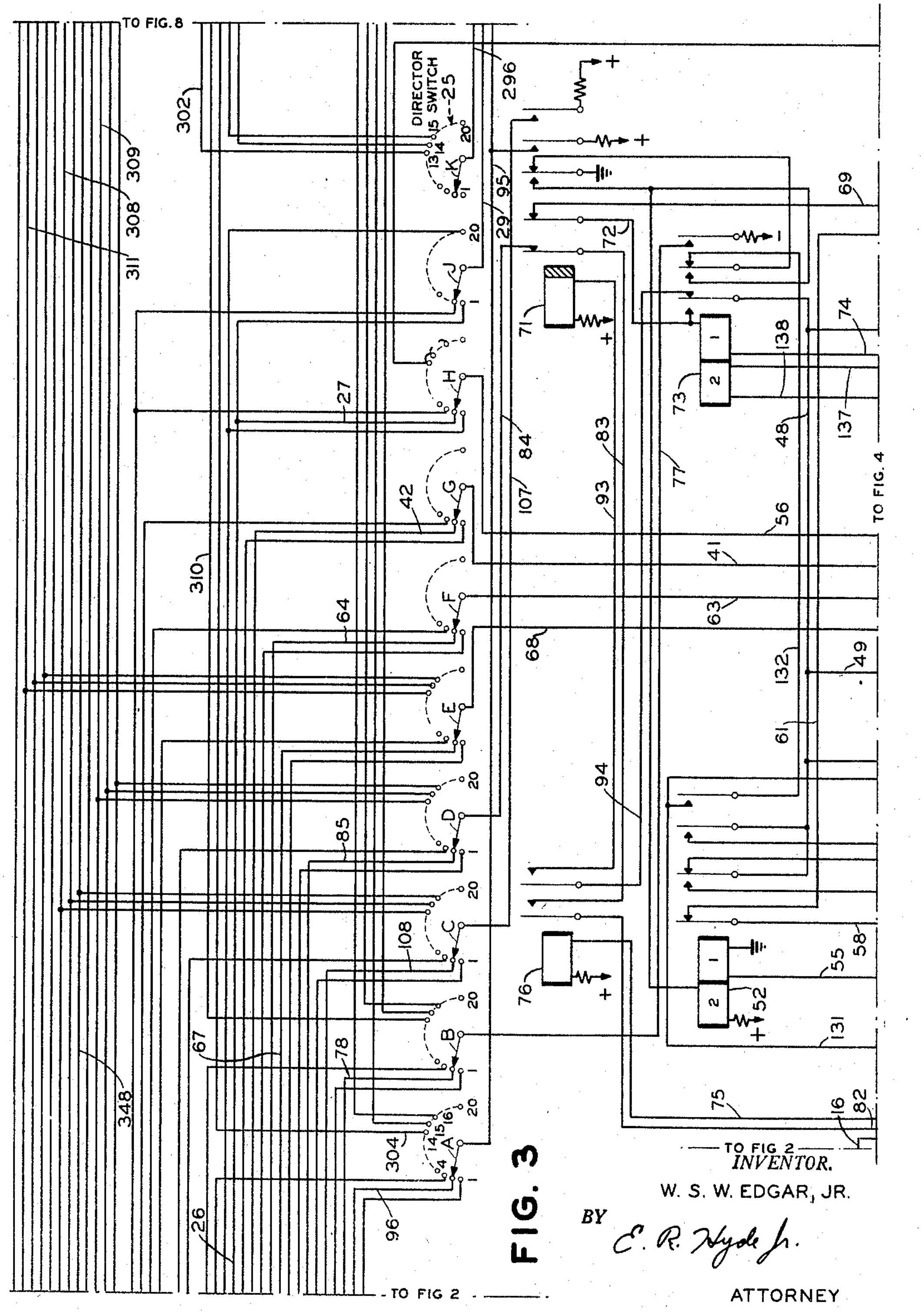
Figure 4:
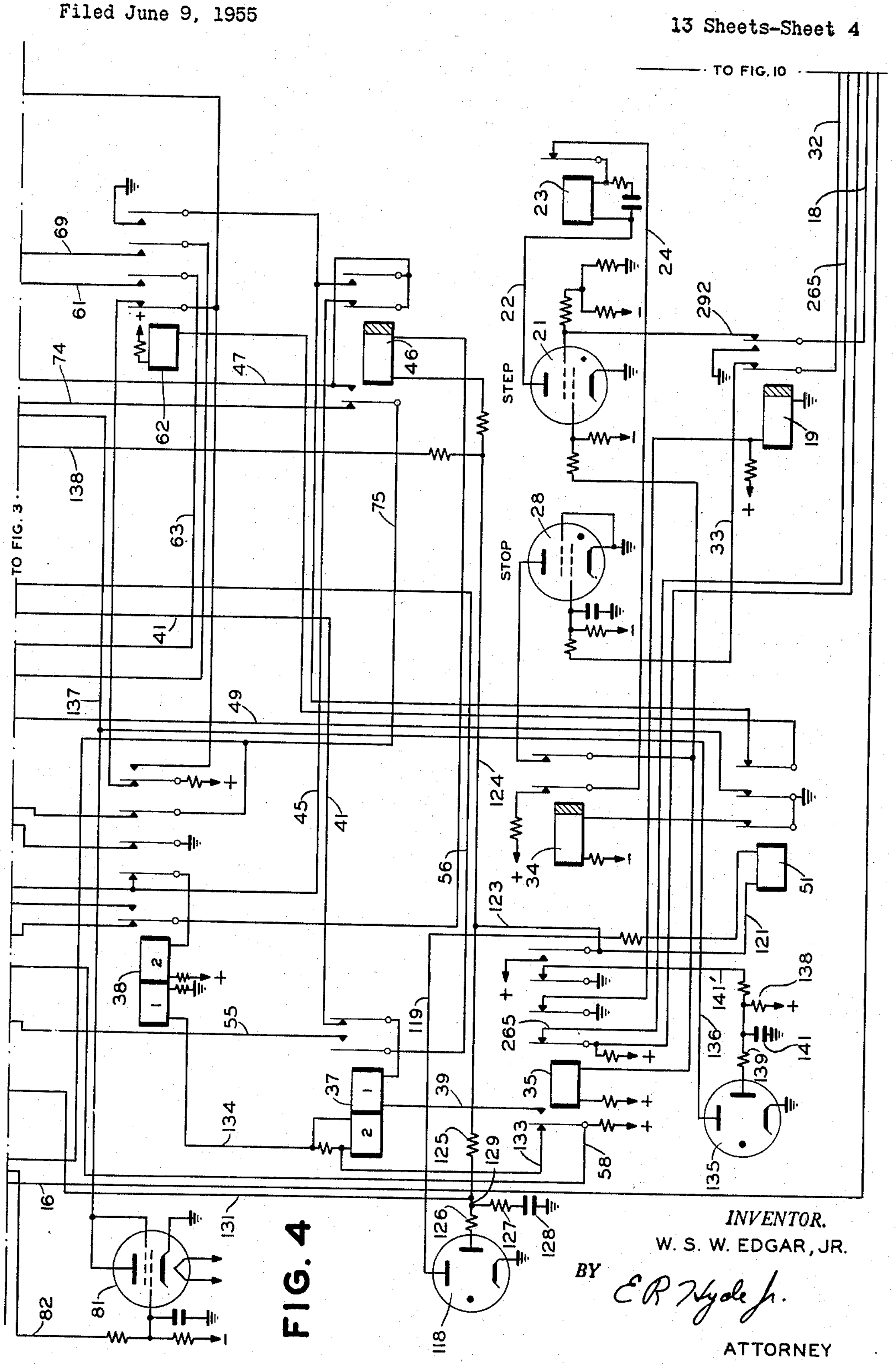

Reference will now be made to Figs. 2 to 4 which when placed together disclose the circuit details of the common control switching equipment along with the transceivers 2 and 3 shown in block form. The system will be described by considering a connection made from outstation No. 2 to outstation No. 3. The operator at station 2 initiates a call, after wrapping a sending blank on the transceiver drum, by pressing his send button which puts positive battery on his calling line L1. The manner in which this positive battery is applied to the calling line of the sending outstation No. 2 will be described hereinafter in considering the operation and circuit details of the outstations. The positive battery from the outstation is transmitted over line L1 and received at the common control switching equipment 5 (Fig. 1) located at the master station. This equipment includes a plurality of switching units generally indicated by numerals 20, 30 and 40 in Fig. 2. These units are of identical construction and each is associated with one of the transceiver outstations. The positive battery from station No. 2 takes two paths, one of which may be traced through the closed contacts of relay 13, rectifier 14, wire 15, wire 16, the closed contacts of relay 17 (Fig. 10), wire 18, a break contact of relay 19 (Fig. 4), wire 292, to the shield grid of tube 21. Positive battery is supplied to the plate of tube 21 over line 22, director switch step magnet 23, the contacts thereof, wire 24 and make contacts of normally energized relay 34 to positive battery. Tube 21 is so biased that the positive battery from the calling outstation No. 2 to the shield grid of the tube causes this tube to fire. Stepping magnet 23 being in the plate circuit energizes to step director switch 25 (Fig. 3). This switch is a multi-level rotary type switch of common construction, which is stepped by the releasing of magnet 23 after it is energized. Upon energizing, the stepping magnet opens its contacts to break the plate circuit of step tube 21. This results in deenergization of the stepping magnet, whereupon the plate circuit is reestablished to again operate the stepping magnet. This recurring cycle will continue stepping the director switch until tube 21 is prevented from further conduction.

It is recalled that the positive battery from the calling line L1 followed two paths, one of which was traced to the shield grid of tube 21. The other path may be traced from the contacts of relay 13, wire 26, to the the 1 contact of the J level of director switch 25. This contact is strapped to the 2 contact of the H level of the director switch by wire 27. When the arm of the J level finds this positive battery on contact 1, a circuit is established to the control grid of tube 28. This circuit may be traced from the arm of the J level wire 29, the break contacts of relay 17 (Fig. 10), wire 32, break contacts of relay 19 (Fig. 4), wire 33, to the control grid of tube 28. This tube serves to stop the stepping action of tube 21 and hence will be referred to as the stop tube. The positive battery applied to the control grid of stop tube 28 will bias this tube to conduction. The plate circuit of the stop tube is completed to positive battery through the normally closed contacts of relay 34 and the coil of relay 35. As the stop tube conducts, its plate will swing less positive in the usual manner and since it is tied to the control grid of the stepping tube, further conduction of the latter is prevented. In this manner the recurring stepping of the director switch is stopped. However, it will be noted that the positive battery on the calling line of outstation 2 arrives simultaneously at the shield grid of the stepping tube and the control grid of the stop tube when the director switch arrived at stud 1. Therefore, when the stop tube is fired, the stepping tube is fired simultaneously and the director switch is stepped once more before it comes to rest. Consequently it is necessary for the director switch to find the stopping positive battery on the J level, at the stud in advance of the group of studs where the director switch is to come to rest. For the example herein described the stopping of the director switch is initiated on stud 1 of the J level and the switch comes to rest on studs 2 which corresponds to the calling outstation No. 2. If outstation No. 3 were making the call, positive battery would be found on the No. 2 stud of the J level in order to stop the director switch on the No. 3 studs.

The function of the group of relays, rotary switch and tubes making up the director is to establish a connection between the calling and called parties. The connection is made through a connecting switch associated with each outstation that is equipped to transmit. Switch 36 is the connecting switch associated with outstation No. 2. This connecting switch is moved or stepped by dial pulses from the calling outstation and comes to rest on the stud corresponding to the station being called. At the end of each transmission a connect relay releases to terminate the connection, but the rotary connecting switch is not restored to its home position. Therefore the director circuits must provide means for returning the connecting switch to its home position at the beginning of each new transmission. The function of returning the connecting switch to its home position will now be described.

Just before the director switch stopped stepping, relay 35, which is connected in the plate circuit of the stop tube 28, was energized by the firing of tube 28. Upon the operation of relay 35 its transfer contact transfers an energizing circuit from the 2 coil of relay 37 to the 1 coil thereof. Relay 37 is normally energized during the standby condition of the equipment by the battery applied through the transfer contacts of relay 35, wire 133, the 2 coil of relay 37, wire 134, the 1 coil of relay 38 to ground. Because of the shunt on coil 2 of relay 37, this relay stays operated long enough for its 1 coil to be energized upon the operation of relay 35. A circuit may now be traced from the positive battery at the transfer contacts of relay 35, wire 39, coil 1 of relay 37, make contacts of relay 37, wire 41, the arm of the G level of the director switch now on stud 2 (Fig. 3), wire 42, the strap on the K level of connecting switch 36 (Fig. 2), wire 43, connecting switch stepping magnet 44 to ground. This completed circuit will energize stepping magnet 44 to cause connecting switch 36 to step to the next stud. With each energization of step magnet 44 its contacts open the circuit above traced to deenergize the stepping magnet which in turn closes the contacts. This action is repetitive until the connecting switch 36 arrives at its home position on contact 1. It is seen that the contact 1 position will result in the stepping circuit being interrupted to prevent any further stepping of the connecting switch. With the connecting switch on contact 1, the circuit is now prepared to receive dialing pulses from the calling outstation No. 2.

When relay 35 operated by the firing of stop tube 28, it caused the connecting switch 36 of the calling outstation to step to the home position by keeping relay 37 operated (Fig. 4). In addition, relay 38 was maintained operated through its No. 2 coil, one of its make contacts, wire 45, break contacts of relay 46, wire 47, wire 48 (Fig. 3), wire 49 (Fig. 4), break contacts of relay 51 to ground. When the connecting switch 36 arrived at its home position to break the circuit of the connecting switch stepping magnet 44, the energizing circuit for relay 37 was also interrupted, causing this relay to release. A circuit is thereby completed from the 1 coil of relay 52, wire 55, through break contacts of relay 37, wire 56, to the positive battery on the 2 stud of director switch level H. When relay 52 operates, the locking circuit of relay 38 is transferred from relay 46 to relay 52. Relay 46 operates through make contacts of relay 38 and relay 52.

With the equipment now in condition to receive dial pulses, the operator at outstation No. 2 will dial the number 3 which designates the station being called. This causes these pulses to be applied to the calling line L1. These pulses are formed by removing the positive battery from the calling line thereby causing the connecting switch 36 to step to the stud corresponding to the outstation that is being called, in this case stud 4 corresponding to outstation No. 3.

With relay 37 released, relay 52 is energized by the positive battery found on calling line L1 of outstation No. 2. Since the dialing pulses consist of taking positive battery off calling line L1, relay 52 will release with each dialing pulse. With each release of relay 52, positive battery is applied to the connecting switch stepping magnet 44 as follows: positive battery at the transfer contacts of relay 35, wire 58, break contacts of relay 52, wire 61, closed make contacts of relay 62 now operated by relay 46, wire 63, the arm of F level of the director switch 25, stud 2, wire 64, and the coil of stepping magnet 44 to ground. It is seen, therefore, that each time relay 52 releases as a result of a dialing pulse, stepping magnet 44 will energize and, upon its release, step the connecting switch. In the example chosen, outstation No. 2 will dial the number 3 thereby producing three stepping pulses resulting in connecting switch 36 stepping to stud No. 4 which corresponds to called station No. 3.

The first time that relay 52 releases, in following the dial pulses, relay 38 will also release. The transfer contacts of relays 52 and 38 will open the circuit of relay 46. However, this relay is of the slow-to-release type and will remain operated during the first dial pulse at which time relay 52 will reenergize relay 46. At the termination of the dialing pulses, relay 52 remains energized because positive battery still appears on line L1 of the calling outstation No. 2. With relay 52 thus continually energized, relay 46 will finally release.

*Testing for busy condition*

Before connection can be made between outstation No. 2 and outstation No. 3, the latter must be tested to determine whether or not it is busy. If the called outstation is in operation, ground appears on a busy lead 65, as will be hereinafter described. This ground is passed from lead 65 to wire 66, the arm of level E of connecting switch 36 now on stud 4, wire 67, level E of the director switch on stud 2, wire 68, a make contact of relay 62 (Fig. 4), wire 69, a break contact of relay 71 (Fig. 3), wire 72, coil No. 1 of relay 73, wire 74, a break contact of relay 46 (Fig. 4) now released, wire 75, the coil of relay 76 (Fig. 3), to positive battery. This circuit will cause relays 73 and 76 to energize. Relays 73 and 76 will lock up through a make contact on relay 73 and by wires 48 and 49 to ground. Relay 73 puts negative battery through a make contact, wire 77, the arm of the B level of director switch 25 now on stud 2, wire 78, wire 79 (Fig. 2), to the answer line L2 of calling outstation No. 2. This negative battery returning to the calling patron lights a busy lamp and sounds a buzzer at the calling station. This indicates to the operator that outstation No. 3 is busy and that a connection can not be made at this time.

The busy condition just explained results when a called station is actually connected to some other outstation. However, a condition may exist where the called station No. 3 has just initiated a call thereby setting its transceiver up as a transmitter and is waiting to make a connection. Under this condition, there is no ground found on the busy line of station No. 3. Consequently, the above test would fail and outstation No. 2 would be attempting to call outstation No. 3 which is also attempting to place a call. To avoid this situation, an additional busy test is provided. To understand this test, assume that the outstation No. 3 send button is operated after outstation No. 2 starts to call. After outstation No. 2 has dialed, relay 46 will release establishing the same circuit through relays 73 and 76 as above described. However, since the ground is missing on the busy line of outstation 3 relay 73 will not operate and relay 76 will release. This establishes a circuit to the control grid of tube 81 (Fig. 4) which may be traced from said control grid, wire 82, closed contacts of relay 76 (Fig. 3), wire 83, closed contacts of relay 71, wire 84, the arm of the D level of director switch 25 resting on stud 2, wire 85, the arm of C level of the connecting switch resting on stud 4 (Fig. 2), wire 86, wire 87, wire 88 to the calling line L3 of outstation No. 3. It is recalled that when an outstation initiates a call, positive battery is put on its calling line. Since outstation No. 3 has placed a call after outstation No. 2 has dialed, a positive battery is found on calling line L3 and applied to the control grid of tube 81 over the above traced circuit. This tube is so biased that this positive battery will result in conduction thereof. The 2 coil of relay 73 (Fig. 3) is in the plate circuit of tube 81 to which positive battery is applied through the make contact of relay 35 which is energized at this time. Thus, upon the conduction of tube 81, relay 73 will energize resulting in the energization of relay 76. These relays will then lock up from positive battery through the coil of relay 76, wire 75, a break contact of relay 46 (Fig. 4), coil 1 of relay 73, a make contact of relay 73 (Fig. 3), wire 48, wire 49, a break contact of relay 51 (Fig. 4) to ground. Relay 73 puts negative battery on the calling outstation's answering line L2 as in the first busy condition test. This causes a busy lamp to light and a buzzer to sound at outstation No. 2 informing the operator that outstation No. 3 is busy.

*Making the connection*

In the event that neither of the above busy tests finds the called outstation busy, the connection is made between station No. 2 and station No. 3. This connection is accomplished by the operation of relay 71, which is a slow-to-operate relay to permit sufficient time to elapse to make the above described second busy test. It is recalled that relays 73 and 76 energize only after the called station is found to be busy. If the called station is prepared to receive a call, relays 73 and 76 will not operate. A circuit may therefore be traced from positive battery through relay coil 71, wire 93, closed break contacts of relay 76, wire 94, break contact of relay 73, wire 48, wire 49, break contact of relay 51 (Fig. 4) to ground. Upon the operation of relay 71, positive battery may be traced from a make contact of this relay, wire 95, the arm of the A level of director switch 25 resting on stud 2, wire 96, wire 97 (Fig. 2), the coil of relay 98 to ground. Relay 98 will operate and perform a number of functions. A ground is placed on the busy lead of outstation No. 2 through a make contact, wire 101 and wire 102. This ground will serve to inform the operator at any of the other outstations that outstation No. 2 is connected to another outstation and is therefore in the busy condition. The same ground will operate relay 13 through wire 103, the coil of relay 13 to positive battery. Another ground may be traced through make contacts of relay 98, wire 104, the arm of level E of connecting switch 36 resting on stud 4, wire 66 to the busy multiple 65 of outstation 3. The ground on the busy lead of outstation No. 3 informs an operator at another outstation that outstation No. 3 is connected to some other outstation and is therefore in the busy condition. This ground also operates relay 105 (corresponding to relay 13 of station 2) thereby removing outstation No. 3 from the calling multiple 16 so that the station can no longer initiate a call. However, between the time that the called line test was made and the operation of relay 105, there is a possibility that the operator at outstation No. 3 might initiate a call by pushing the send button. The switching equipment could not detect this fact since it has already made tests to determine if the called party is busy. Finding that the outstation was free to receive a call, relay 71 was allowed to operate to complete the connection. It is the operate time of relay 98 which delays the actual calling after the tests are made. To reduce the time between the second busy test and calling the operation of relay 71 applies positive battery to the calling line before relay 13 operates. This circuit may be traced from positive battery at a make contact of relay 71 (Fig. 3), wire 107, the arm of level C of director switch 25 resting on stud 2, wire 108, the arm of D level of connecting switch 36 resting on stud 4 (Fig. 2), wire 109, wire 110, wire 91, and thus to the answer line L4 of outstation No. 3.

The operation of relay 98 also connects lines L2 and L1 of outstation No. 2 to lines L3 and L4 respectively of outstation No. 3 through two make contacts and levels C and D of connecting switch 36. These connections may be traced as follows: calling line wire L1 of outstation No. 2, wire 111, wire 112, a make contact of relay 98, the arm of level D of connecting switch 36, wire 109, answering wire 110 of outstation No. 3, wire 91, to answering line L4 of outstation No. 3. The other connection is traced from answering line wire L2 of outstation 2, wire 79, a closed make contact of relay 98, wire 113, the arm of level C of connecting switch 36, wire 86, calling line wire 87 of outstation No. 3, wire 88, to calling line wire L3 of outstation No. 3. Another make contact locks relay 98 operated to the positive battery found on the calling line of outstation 2. This may be traced from calling line wire L1, wire 111, wire 112, a make contact of relay 98, wire 97, the coil of relay 98 to ground. The positive battery on the calling line of station 2 will continue to sound the buzzer of the machine of outstation No. 3. The operator at station No. 3 will answer the call, after wrapping a receiving blank on the transceiver drum, by operating his receive button. At this time the connection between the two stations is completed and the latter is prepared to receive a facsimile telegraph message upon the completion of phasing which is hereinafter described.

*Releasing the switching equipment*

With the connection made between outstation No. 2 and outstation No. 3, the common switching equipment may now be released to be available to handle other calls. The releasing of the equipment is effected by the firing of gas tube 118 (Fig. 4). The cathode of the tube is grounded and positive battery is supplied to the plate over wire 119, relay coil 51, wire 121 and make contacts of relay 35. This positive battery also connects to the starter anode over wire 123, wire 124, resistor 125 and resistor 126. The junctions of resistors 125 and 126 are grounded through resistor 127 and capacitor 128. Thus when relay 35 is energized positive battery is applied to the starter anode of tube 118 and to the RC combination in the starter anode circuit. The time constant of the RC circuit is such that the capacitor 128 will charge to a point to fire the tube in approximately 4/10 of a second. Junction 129 is normally connected to ground by wire 131 and make contacts of relay 38. Ground is also supplied to junction point 129 through make contacts of relay 52 (Fig. 3), wire 132, and break contacts of relays 73 and 71. It is seen therefore that capacitor 128 is prevented from charging when relay 38 is energized or when relay 52 is energized along with deenergization of relays 73 and 71. In the sequence of operation, relay 38 is normally operated thereby shorting condenser 128. When the director switch is to stop, the stop tube 28 fires to operate relay 35 thereby applying positive battery to the anode and starting anode of tube 118. When the ground is removed from junction 129 in the starter anode circuit, capacitor 128 will begin to charge. It is recalled that in the normal sequence of operation, relay 38 releases the first time that relay 52 released when the calling operator dials. As the dialing pulses continue, relay 52 will energize and deenergize, the ground being alternately applied to junction 129 to discharge the capacitor. Although the capacitor charges with each pulse due to the release of relay 52, it does not reach the firing potential before relay 52 is again operated. After the dial pulses, when relay 52 is maintained operated, either relay 71 or 73 will energize. It is recalled that relay 73 energizes upon the detection of a busy condition and in the absence thereof relay 71 energizes to effect the connection. In any event, one of these relays will energize to open the grounding circuit to junction 129. Since relay 38 is also unoperated at this time, capacitor 128 will continue to charge to a point where tube 118 is caused to fire. Relay 51 being in the plate circuit of the tube will operate and open the operating relay circuits allowing them to release. After slow release relay 34 releases, the circuit for relay 35 is opened and it releases. The release of relay 35 opens the plate circuit of tube 118 to cause relay 51 to release. Relays 37 and 38 will then energize through a circuit that may be traced from positive battery at the transfer contacts of relay 35, wire 133, the 2 coil of relay 37, wire 134, and the 1 coil of relay 38 to ground. Energization of relay 38 results in the operation of relay 76 (Fig. 3) and relay 34 (Fig. 4) operates when relay 51 releases. The control equipment is now in its standby or normal condition with relays 34, 37, 38 and 76 operated and the remainder of the relays unoperated as shown in the drawings. The equipment is ready to receive another call from one of the outstations.

In normal operation therefore in approximately 4/10 of a second after either relays 71 or 73 operate, the switching equipment restores itself to its normal idle condition. A special condition results when an operator at an outstation, after initiating a call by operating the send button, fails to dial. At this time, relay 37 is released allowing relay 52 to operate as describe above. The dial lamp is lit at the calling outstation and relay 52 is prepared to follow the transmitter dial pulses. When no dial pulses are transmitted, the switching relay group cannot follow through to its automatic release because neither relay 71 nor 73 operates. The switching equipment is then tied up and other outstations are prevented from calling. To release the switching equipment under this condition, gas tube 135 is provided (Fig. 4). Positive battery is supplied to the anode of this tube over wires 136, wire 137, the 2 coil of relay 73 (Fig. 3), wire 138, wire 124 (Fig. 4), wire 123 and make contacts of relay 35. A source of positive potential is connected to the starter anode through resistors 138 and 139. A capacitor 141 is connected to the junction of resistors 138 and 139 and to ground. Another ground connects to the junction of these resistors over wire 141' and break contacts of relay 35. It is recalled that relay 35 operates upon the firing of step tube 21. As relay 35 operates, ground is removed from capacitor 141 which being connected to positive battery through resistor 138 commences to charge. The time constant of resistor 138 and capacitor 131 is such as to cause tube 135 to fire approximately fifteen seconds after capacitor 141 starts to charge. When the starter anode reaches firing potential, tube 135 will fire to operate relay 73 which, as pointed out above, indicates a busy condition and operates the busy lamp and buzzer at the calling outstation. Also, the operation of relay 73 permits the gas tube 118 to fire, as previously explained, restoring the switching equipment to the standby condition. It is seen, therefore, that failure of the calling operator to dial will result in the switching equipment being released and the operator being notified of this by energization of his busy lamp, and sounding of a buzzer.

Relay 19 is of the slow release type and operates, after relay 35 energizes, to disconnect tubes 21 and 28 from their respective starting circuits. Relay 19 also grounds the calling multiple 16 and holds it grounded for a short interval after each connection is made. This insures that any charge on the calling line will be dissipated and prevents false operation of the director switch when it is released after handling a connection.

*Operation at the calling outstation*

Figure 5:
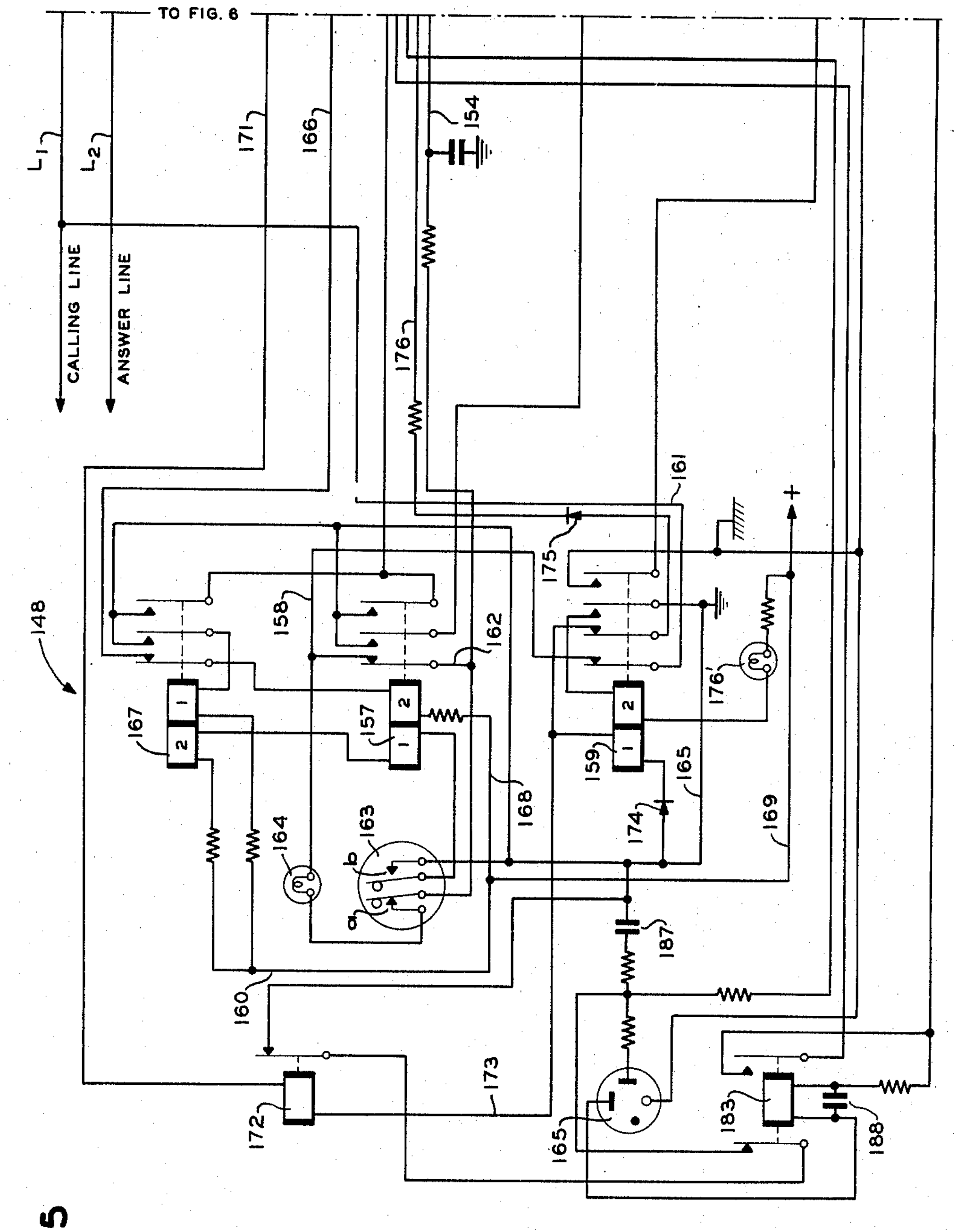
Figure 6:
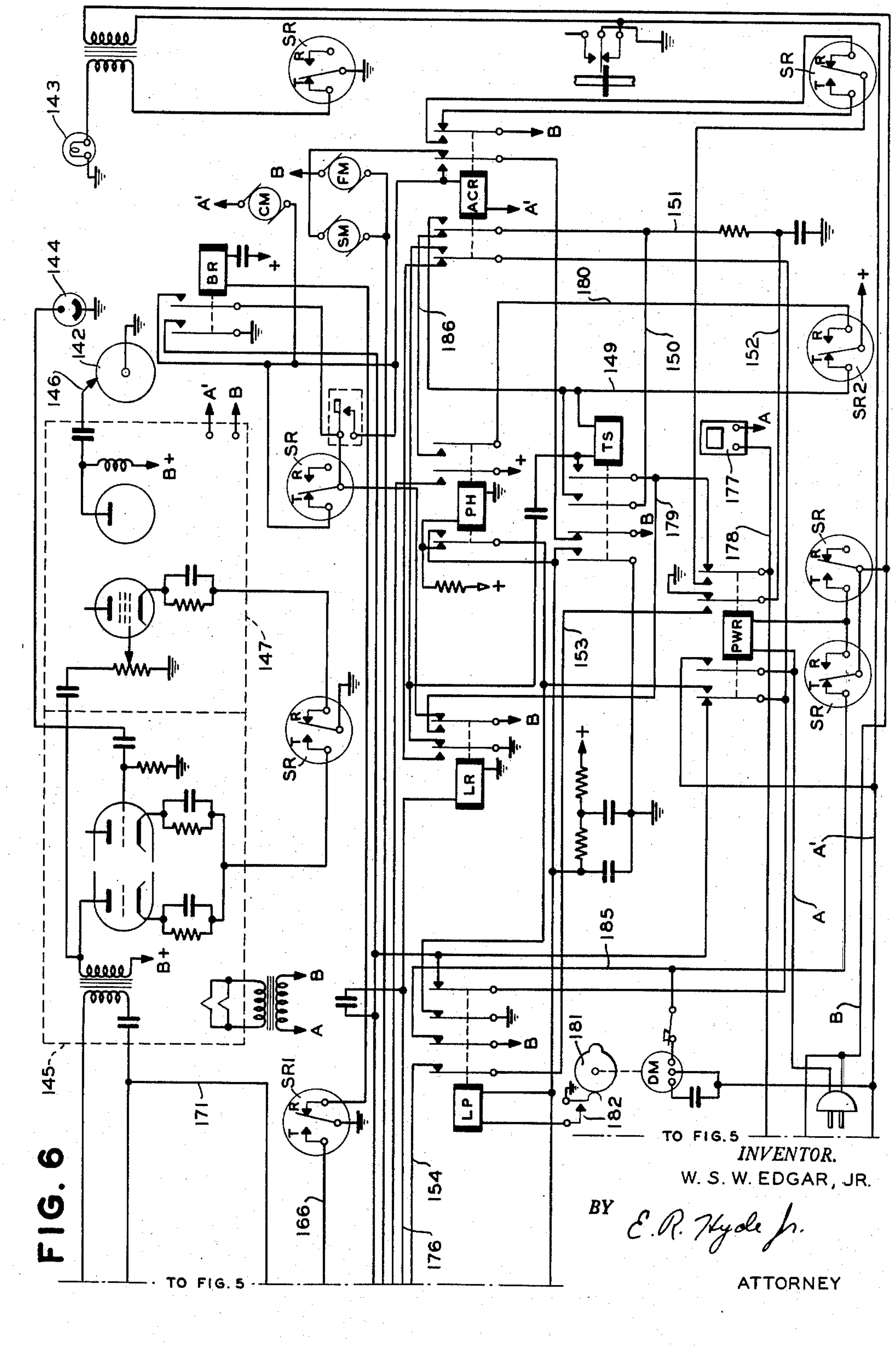

Having described the operation of the common control switching equipment, the operation at the outstation facsimile machine will now be considered by referring to Figs. 5 and 6. Outstations 2 and 3 are equipped to both transmit and receive and the machine at each of these stations consists of a transceiver which may be of the general type disclosed in U.S. patent applications of G. H. Ridings, Serial No. 240,913, filed August 8, 1951, and R. J. Wise et al., Serial No. 224,926, filed May 7, 1951. The transceivers 2 and 3 represented in block form in Figs. 1 and 2 and shown in detail in Figs. 5 and 6, are of somewhat conventional construction and reference may be had to the above-cited applications for the structural details thereof. It is sufficient for the purposes of the present invention to state that this transceiver is of the type wherein a message blank is wrapped around a drum 142 roated by a synchronous motor DM. An optical system including a light source 143 and a photoelectrical cell 144 scans the message to be transmitted as the drum is fed axially by a drum feed motor FM. The photocell is connected to the line through a transmitting amplifier 145. For receiving, a sheet of electrosensitive paper is mounted on the drum 142 and a conductive stylus 146 traverses the paper for selective marking thereof in accordance with received impulses. The stylus is connected to the line through a receiving amplifier 147. The transceiver is energized from a local source of power such as 110-volt, 60-cycle source connected to bus bars A and B. Energization of the power relay PWR connects bus bar A with line A1 to put the machine in operation. Each transceiver is modified with dialing equipment generally indicated by number 148 (Fig. 5).

This equipment operation will be described by following through a call from outstation No. 2 to outstation No. 3. As disclosed in the above-cited patent applications, each transceiver has a send and receive button which controls a plurality of send-receive switches SR schematically illustrated in Figs. 5 and 6. An operator at outstation 2 desiring to transmit will mount the message on drum 142 and press the send button which closes the T contacts of the SR switches. It is recalled that transmission is initiated by applying positive battery to the calling station's calling line. With the send-receive contacts in the transmit position power relay PWR is energized and line A1 is connected to bus bar A. Positive battery may be traced from the center contact of switch SR2, the T contact thereof, wire 149, make contacts of relay TS (now energized), wires 150, 151, 152, make contacts of relay PWR, wire 153, break contacts of relay LP, wire 154, the dial contacts *a* of dial 163 (Fig. 5), lamp 164, wire 158, break contacts of relay 159, wire 161 to calling line L1. The calling line circuit is ultimately completed by finding ground through the 1 coil of relay 52 (Fig. 3) of the common control switching equipment as previously described in considering the operation of this equipment. The dial contacts *a* of dial 163 and dial lamp 164 are normally shorted by a break contact of relay 157. However, when the operator at station 2 operated his send button, relay 157 was energized by ground through the T contacts of SR1 (Fig. 6), wire 166, break contacts of relay 167, the 2 coil of relay 157, wire 168, wire 169 to positive battery. With relay 157 thus energized, its break contact will open to remove the short around dial contacts "*a*" of dial 163 and dial lamp 164. The lamp will light and indicate to the operator that he may dial the number of the outstation desired. In the example assumed, the operator will dial No. 3 corresponding to outstation 3. This will result in the dial contacts "*a*" of dial 163 opening and closing three times which, as explained in regard to the switching equipment, constitute the dial pulses. When the operator begins to dial, the off-normal contacts "*b*" of dial 163 will close to operate relay 167. This circuit may be traced from ground, wire 165, through the off-normal contacts "*b*," through the 1 coil of relay 157, the 2 coil of relay 167, wire 169, wire 169 to positive battery. Relay 167 operates and locks to ground through one of its make contacts and its 1 coil. The operation of relay 167 opens the 2 coil of relay 157 but the latter remains operated since its 1 coil is energized in series with the 2 coil of relay 167. It is recalled that the dial pulses from outstation No. 2 result in connecting switch 36 (Fig. 2) stepping to the stud corresponding to outstation No. 3.

When the dial returns to its normal position, the off-normal contact opens allowing relay 157 to release to restore the short circuit around dial 163 and dial lamp 164. At this time the switching equipment is performing the busy test previously described. If outstation No. 3 is found to be busy, negative battery is placed on the answering line L2 of outstation No. 2 in a manner to be hereinafter described in considering the operation of the called outstation. This negative battery operates busy relay 159 over a circuit traced from answering line L2, wire 171 (Figs. 6 and 5), relay coil 172, wire 173, the 1 coil of busy relay 159 through a negative poled rectifier 174 to ground. The same negative battery is also passed through a break contact of relay 159 to a second rectifier 175 poled to oppose negative. In this manner, relay 159 will operate and lock up through its 2 coil and a make contact to ground. Busy lamp 176′ will light and buzzer 177 will sound informing the operator at outstation 2 that the equipment at outstation 3 is in a busy condition.

*Operation at the called outstation*

If the station being called, in this case outstation No. 3, is not busy connections will be made between station 2 and station 3 as described above in the description of the common switching equipment. The positive battery on the calling line of station No. 2 will terminate at the answering line of station No. 3 since these lines are transposed. Reference will now be made to Figs. 5 and 6 in considering the operation at the receiving station. The positive battery appearing at the answering line may be traced over wire 171, relay coil 172, wire 173, to a break contact of normally unoperated busy relay 159. The positive battery appearing at this contact has a path through the 1 coil of relay 159 to a rectifier 174. However, due to the negative polarity of this rectifier, this path presents a high impedance and the battery goes through the break contact, another rectifier 175 poled for positive battery, wire 176, line relay LR (Fig. 6) to ground. The line relay will operate to sound buzzer 177 over a circuit that may be traced from bus bar A, buzzer 177, wire 178, break contacts of power relay PWR, wire 179 and make contacts of relay LR to bus bar B. When the buzzer sounds at outstation No. 3, the operator will press his receive button after placing a sheet of recording paper on drum 142. Actuation of the receiving button will close the R contacts of switches SR thereby placing the machine in condition to receive. The method of phasing is somewhat similar to that disclosed in the above cited Ridings application modified somewhat because of the master sending feature of the sending system which will be hereinafter described.

The phasing circuit will now be considered. It is recalled that positive battery is applied to the calling line of station No. 2 through a circuit that includes break contacts of the relay LP at the sending station. When the sending operator pressed his send button, the power relay PWR energized to connect bus bar A with line A′ thereby energizing drum motor DM. A commutator 181 closes contact 182 with each revolution of the drum. This switch completes a circuit to periodically energize relay LP which will pulse at synchronous speed since the drum motor is rotated at synchronous speed. Pulsating relay LP will open and close contacts (the calling line of outstation No. 2 positive battery circuit contacts) which cause phasing pulses to appear on the answering line at station No. 3. The phasing pulses may be traced from the answering line at the receiving station, wire 171 (Figs. 6 and 5), relay coil 172, wire 173, break contacts of relay 159, positive battery rectifier 175, wire 176, line relay LR (Fig. 6) to ground. The line relay will therefore pulse at the synchronous rate. In addition, the normally operated relay 172 will also follow the phasing pulses since it is in series with the answering line circuit. Each time relay 172 operates, it removes ground from the starter anode circuit of gas tube 165 through a break contact on the normally unoperated relay 183. When the operator at station No. 3 pressed his receive button, his power relay PWR operated. This places one side of the A.C. supply to the plate of tube 165 by connecting bus bar A to line A′. At the receiving station, the drum motor DM has been energized upon the operation of power relay PWR and by means of the commutator 181 causes relay LP to pulse. The pulsing of the latter relay causes one side of the A.C. supply to the drum motor to be interrupted by a circuit traced from bus bar B, break contacts of relay LP, wire 185 to drum motor DM. Since the drum motor DM circuit is periodically interrupted, it will run at less than synchronous speed causing the relay LP at the receiver to pulse at less than synchronous speed. It should be kept in mind that relay LP at the transmitter operates synchronously to cause relay LR at the receiver to pulse synchronously while relay LP at the receiver is drifting under the control of the drum motor. There comes a time when the two relays LP and LR at the receiving outstation No. 3 pulse oppositely, i.e., LP pulls up and LR releases. When this occurs phase relay PH in the receiving outstation No. 3 transceiver will energize since operation of LP removes one ground from the phase relay and release of LR removes another ground therefrom. With the short thus removed from the phase relay it energizes and locks up independent of the subsequent operation of relays LP and LR. Operation of the phase relay PH grounds one side of relay LP through a pair of make contacts so that LP cannot operate and drum motor DM may be brought up to synchronous speed. Relay PH also applies positive battery to the calling line of receiving outstation No. 3 which may be traced from the R contacts of SR2, wire 180, closed make contacts of relay PH, wire 186, break contacts of relay ACR, wire 151, wire 152, make contacts of relay PWR, now energized, wire 153, break contacts of relay LP, wire 154, break contacts of relay 157 (Fig. 5), wire 158, break contacts of relay 159, wire 161, to the calling line of outstation No. 3. This positive battery will appear at the answering line of outstation No. 2, resulting in operation of line relay LR in the transceiver of outstation No. 3. It is recalled that relay LP at outstation No. 2 was pulsating at synchronous speed. Now with relay LR energized the next time that relay LP pulses, both grounds will be removed from the phasing relay PH, resulting in operation thereof.

Thus, phasing is completed and relays PH at both stations Nos. 2 and 3 were operated. Highly positive battery is placed on the starting anodes of tubes 165 (Fig. 5) at each outstation through make contacts of their respective phasing relays. After the phasing relays operate, the next time relay 172 energizes, it remains energized and the positive battery applied to the starting anodes of the tubes will charge a capacitor 187 to firing potential. The tubes at both outstations will fire when the plate circuit A.C. voltage swings positive to operate relay 183 which opens the ground circuit to the starter anode. This prevents relay 172 from placing the ground back on the starter anode after the tube has fired. The capacitor 188 across relay 183 will keep the plate positive to maintain the relay 183 operated during the negative half of the A.C. cycle. In addition, a make contact of relay 183 will complete the A.C. power circuit for the stylus motor SM and the feed motor FM.

At the end of transmission, a stop button will be operated as described in the above-cited Wise et al. application. Power is removed from each transceiver when its stop button is operated. The locally operated transceiver relays release. Positive battery is removed from each transceiver's calling line which allows the distant transceiver LR relay to release. The removal of positive battery also releases relays 167, 172 and 183 at the calling station. At the receiving station, relays 172 and 183 will release. Both transceivers are then in the normal or standby condition.

*Operation at receiving-only station*

Figure 7:
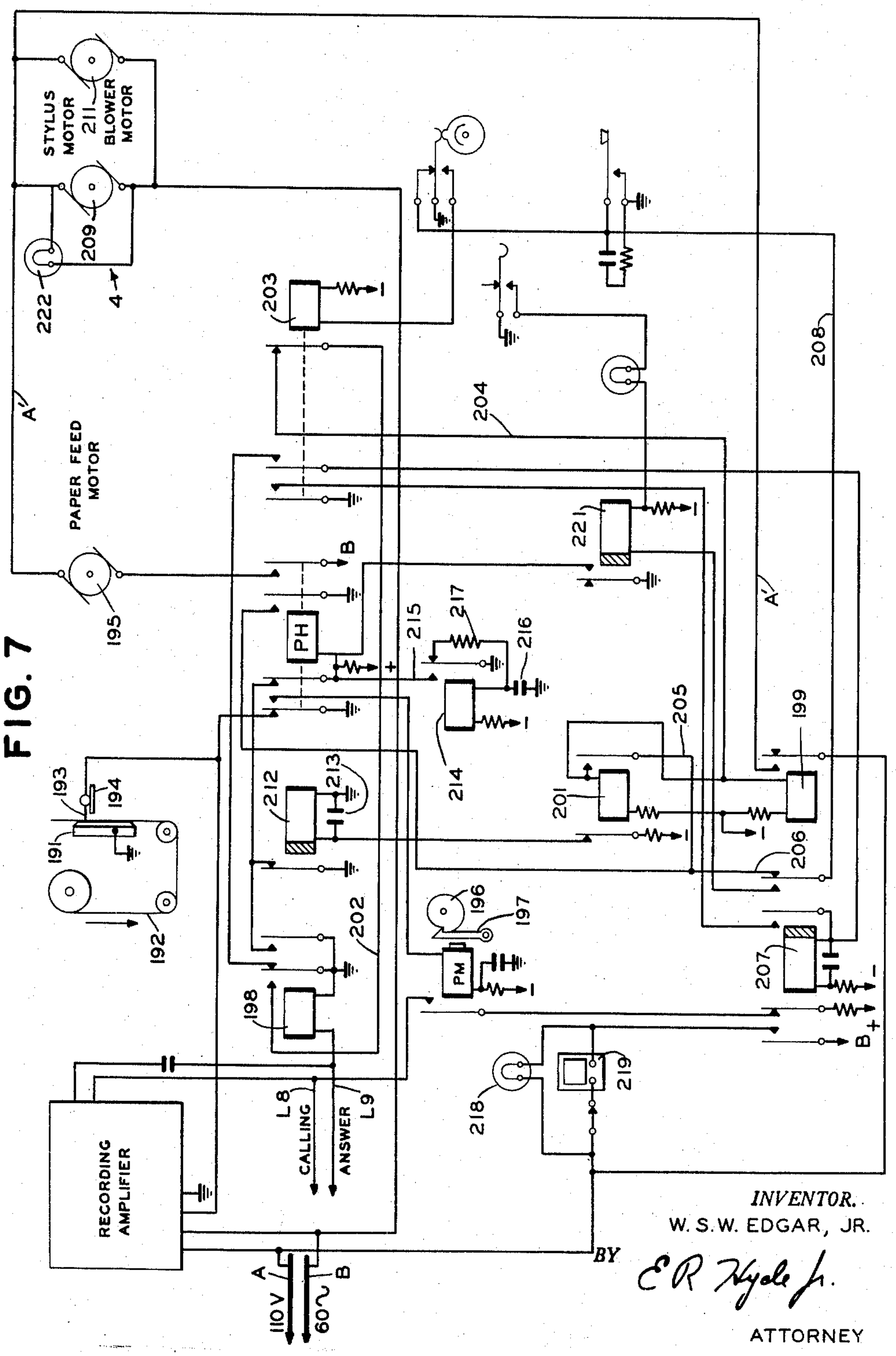

Outstation No. 4 is equipped with a page recorder of the type disclosed in U.S. Patent No. 2,639,211, issued to Hallden and Zabriskie. Since outstation No. 4 is a receiving-only station, there is no need for a dial unit nor an associated switching unit at the master station. Referring now to Fig. 7, there is shown diagrammatically the page recorder. This machine comprises a flat stationary platen 191 over which the message paper 192 is fed from a continuous supply. A stylus 193 is mounted on a movable belt 194 which is driven by motor 195. The connection between belt 194 and motor 195 is such that the belt will not move until a stop disk 196 is released by energization of phase magnet PM which moves its armature 197 to release the stop disk.

In making a call to station 4, the common switching equipment functions in the same manner as when making a call to one of the transceiver outstations as previously described. The receiving-only station functions entirely automatically and therefore may be unattended. It is recalled that when a connection is made between two stations, the positive battery put on the calling line of the station initiating the call appears on the answering line of the called station. Thus positive battery will appear on line L9 to energize relay 198 which will pull up and follow the phasing pulses. The first time relay 198 operates, circuits are completed to operate relays 199 and 201. This circuit may be traced from ground through a make contact of relay 198, wire 202, normally closed break contact of relay 203, wire 204 through relays 199 and 201 connected in parallel, to negative battery. The latter relays once energized will lock up to ground through a make contact of relay 201, wire 205, wire 206, a break contact of relay 207, wire 208, and paper feedout contacts to ground. The recorder is energized from a local source of power such as a 110-volt, 60-cycle supply connected to bus bars A and B. A make contact of relay 199 connects bus bar A with line A' which connects to one side of stylus motor 209, paper feed motor 195 and blower motor 211. The other side of these motors is normally connected to the B bus bar. Thus, when relay 199 energizes, the motors are connected across the A.C. source and likewise energize. The operation of relay 201 opens the battery circuit of the normally operated slow release relay 212. The latter relay is shunted by a capacitor 213 which insures that the relay will not release until the stylus motor is up to synchronous speed. After relay 212 is released, the next time that relay 198 releases phasing relay PH will energize. The operation of the phasing relay removes a short from stylus 193 by opening a pair of break contacts and also starts paper feed motor 195. In addition, a ground is supplied to one side of phase magnet PM which then moves its armature 197 to permit stylus motor 195 to move stylus belt 194. The phase magnet PM also closes a pair of make contacts to apply positive battery to calling line L8 which appears at the answering line of the calling station. This positive battery starts the calling transceiver as previously described, that is, it operates the calling station's line relay LR which in turn energizes the phase relay PH to initiate transmission of the message. The calling transceiver then sends steady positive battery back to the recorder which results in continuous energization of relay 198. Message transmission then takes place. Shortly after the paper feed motor is energized the paper feed out contacts operate and complete the operate circuit for relay 203. The operation of relay 203 opens the operate circuit for relays 199 and 201 which remain locked up to ground through make contacts on relays 201 and PH.

The phasing relay PH is normally prevented from operating by grounds supplied through contacts of both relays 198 and 212 after relay 198 is initially operated. Since the operation of relay PH starts the calling transceiver, it must not occur before the stylus motor 209 is up to speed. This is insured by the slow release characteristics of relay 212 when relay 198 releases just after the stylus motor is energized. However, when battery is first applied through the battery switch to the recorder circuits, relay PH would energize. Relay 212 would have to operate faster than relay PH to prevent the PH relay from operating at the time the battery is turned on. To prevent this, a relay 214 is provided which will quickly energize when battery is applied to the recorder and will immediately apply ground to relay PH through a make contact and wire 215. Relay 214 will release slowly because capacitor 216 discharges through a resistor 217 of relatively high resistance. During this time interval, relay 212 will have operated placing a ground at the coil side of relay PH. Therefore, when relay 214 releases, relay PH will be effectively shorted by make contacts of relay 212.

When the message has been completely scanned, the transceiver will shut itself off and positive battery will be removed from its calling line to release relay 198. At this point, the end-of-message relay 207 is operated by negative battery, the coil of relay 207, a make contact of relay 203 and a break contact of relay 198 to ground. Operation of relay 207 will remove positive battery from calling line L8 of the recorder and the end-of-message lamp 218 and buzzer 219 will energize. The paper feed motor will continue to feed out paper until the paper feedout contacts are operated at which time relay 203 will be released opening the holding circuit of relay 207. The latter relay is of the slow release type and before it releases relay 221 is operated through a pair of make contacts of relay 207 to ground over wire 208 and the paper feedout contacts. Relay 221 places ground at the battery side of relay PH which immediately releases. The holding ground is removed from both relays 199 and 201 which thereupon release. The release of relay 201 causes the normally energized relay 212 to reenergize placing the ground at the battery side of the phasing relay PH. The slow release relay 221 will finally release but relay PH remains deenergized by make contacts of the operated relay 212.

The release of the phasing relay PH stops the paper feed motor 195 and releases the phase magnet which stops the movement of stylus belt 194. When relay 199 deenergizes, bus bar A is disconnected from line A' and the power for the busy lamp 222, stylus motor 209 and blower motor 211 is shut off. The ultimate release of relay 207 extinguished the end-of-message lamp 218 and stops buzzer 219. Thus, the receiving-only station is restored to a standby condition and it is prepared to receive another call.

*Master Sending*

The business needs of a subscriber company employing the present system may be such that identical messages are often sent from a central point to a number of oustations. In order to expedite the transmission of these messages and to minimize the time during which the equipment is tied up, provision is made to simultaneously transmit a message from a master station to any number of oustations. The master sending equipment 7 (Fig. 1) is disclosed in Figs. 8, 9, 10, and 11 and includes a master transceiver 6, a control panel 250, and various control relays. A row of call push buttons (Fig. 11) such as 251 and 252 is located along the bottom of the control panel. Each one of these buttons is associated with a particular outstation, two being shown for purposes of illustration, although it should be understood that there may be any convenient number. Two indicating lamps such as lamps 253 and 254 are associated with each call button. On the right side of the panel 250 are a number of group push buttons 255, 256 and 257, which are used for a purpose to be hereinafter described. Each of these group push buttons when operated selects a predetermined group of outstations to be called. On the left side of the panel there is a select lamp 258 and two additional push buttons 259 and 261. The select lamp function is similar to that of the dial lamp at a transceiver outstation. When lighted it notifies the operator that the director switch is ready to handle a call and a selection can be made. The release call push button 261 enables the operator to make changes in a selected group of outstations.

To make a master transmission the operator, after placing a sending blank on the transceiver drum, presses the send button in the master transceiver 6 and waits for the select lamp 258 to light. He then proceeds to make a selection by pressing the call button associated with each outstation that is to receive the message. The top indicating lamp of each of the selected outstations thereupon flashes. When the selection is completed the start button 262 is operated. If a selected outstation is busy, the flashing indication shifts from its lamp in the top row to its lamp in the bottom row. The flashing lamps in the top row of the outstations that are not busy will become steady indicating that a connection has been made. As the called outstations answer, the steady light shifts from the lamp in the top row to the lamp in the lower row. After all the selected outstation machines have phased, the master station and all the called outstation transceivers will begin to scan.

The master sending and control equipment will be described by considering an example where a message is being sent simultaneously to outstations No. 2 and No. 3. The operator at the master station will initiate a call by pressing a send button in the master transceiver 6. This puts ground on wire 263 (Fig. 11, 10) in a manner to be hereinafter described which is applied to relay 264 (Fig. 10) operating the latter.

Referring now to Fig. 4, normally unoperated relay 35 connects positive battery through a break contact, wire 265, to relay coil 17 (Fig. 10), the other side of which is grounded through wire 267, a make contact of operated relay 264, wire 268, and a break contact of relay 269 to ground, thereby causing relay 17 to energize. It is seen therefore that if relay 35 of the common control equipment is unoperated, indicating that the switching equipment is idle, relay 17 of the master control equipment will energize. The operation of relay 17 will operate the normally unoperated relay 271 (Fig. 10), and relays 272 and 273 (Fig. 8) by applying ground to each one of these relays. In addition select lamp 258 (Fig. 11) is caused to light through a circuit from negative battery, lamp 258, wire 277, make contacts of relay 17 (Fig. 10) to ground.

The preceding explanation assumes that the director switch 25 was standing idle. If busy, the relay 35 would be operated as previously explained. When the master station operator presses the send button in the master transceiver 6, relay 264 would operate but relay 17 would remain deenergized. The positive battery operating circuit would be open at the break contact of relay 35. The select lamp would not light but the master station call is stored because relay 264 is operated. Then when the switching equipment is released, relay 35 would release and relay 17 would operate lighting the select lamp.

Figure 9:
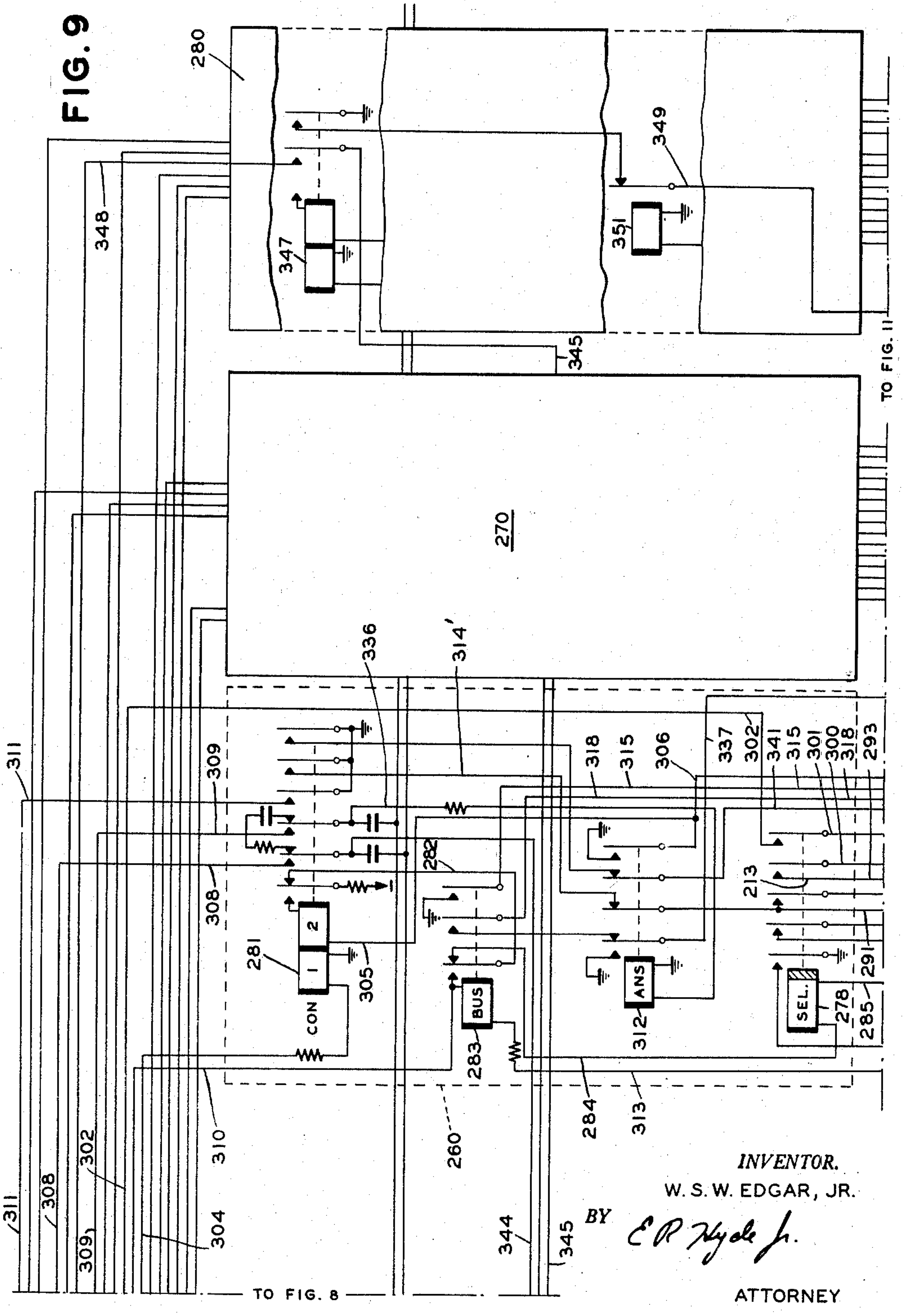
Figure 10:
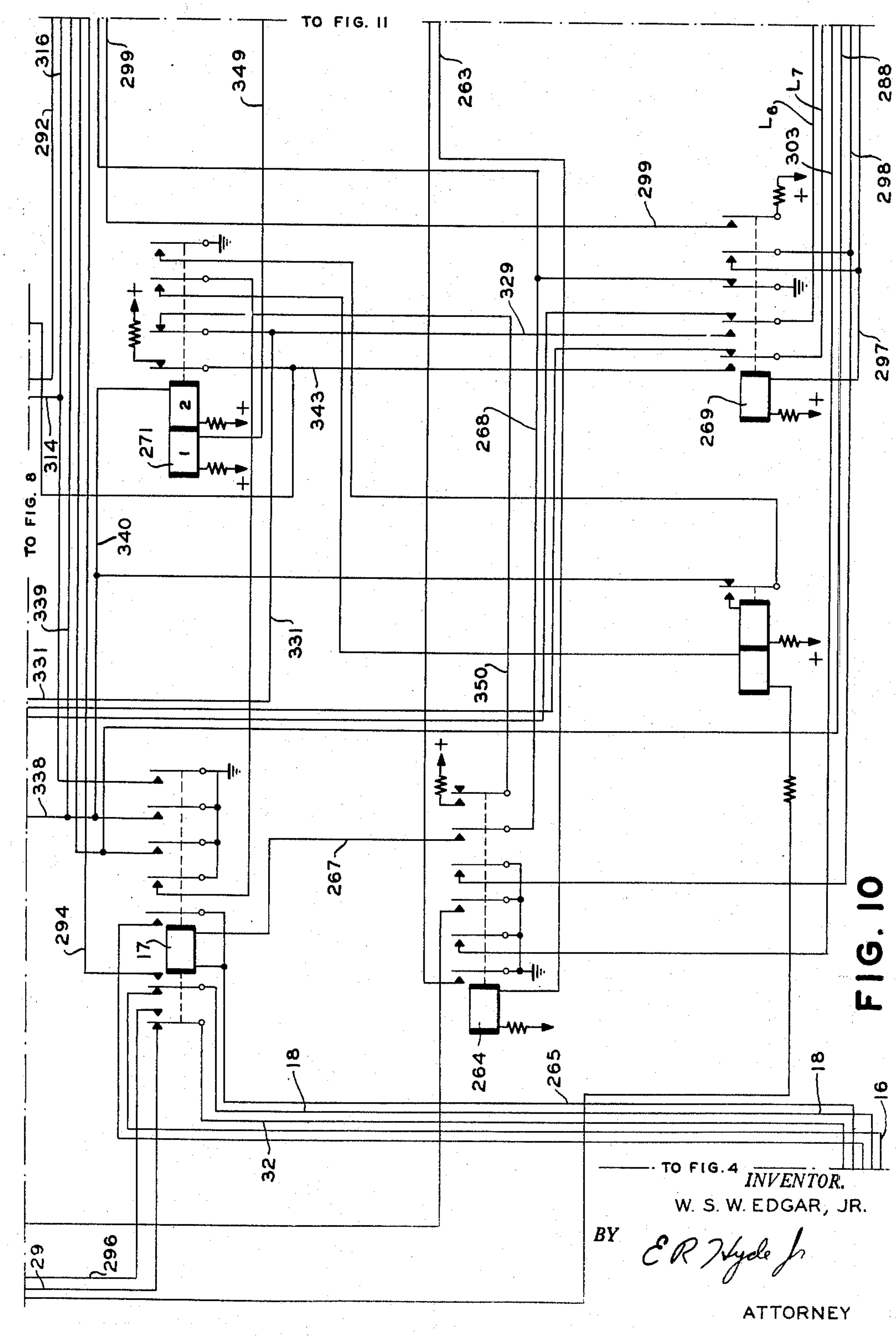

After the select lamp lights, indicating that the master station has control of the common switching equipment, the operator will press the call button of each outstation that is to receive. Each call button connects to a relay group associated with an outstation. Since the present description is based on a system having three outstations, three such relay groups are shown. Numeral 260 (Fig. 9) represents the relay group associated with outstation No. 2 and controlled by call button 251. The relay groups associated with outstations No. 3 and No. 4 are represented by rectangles 270 and 280, respectively, it being unnecessary to illustrate the details of these two groups since they are similar to relay group 260. In describing the circuit and function of group 260, it should be kept in mind that each of the other two groups have similar components. Referring then to group 260, there is shown four relays which for the purposes of description will be termed select relay 278, answer relay 312, busy relay 283 and connect relay 281. In the assumed case call buttons 251 and 252 corresponding to outstations No. 2 and No. 3 would be momentarily depressed. As a result, the select relays associated with outstations No. 2 and No. 3, respectively, will energize. The energizing circuit for select relay 278 goes from negative battery at break contacts of relay 281, wire 282, break contacts of relay 283, wire 284, coil of relay 278, wire 285 (Figs. 9, 11), wire 286, make contacts of call button 251, wire 287, break contacts of release call button 261, wire 288 to ground through make contacts of relay 17 (Fig. 10). It is recalled that when relay 17 energized, it completed a circuit to energize relay 272. Positive battery connected to the coil of the latter relay is traced through coil 2 to ground through a break contact of relay 272, wire 314, and a make contact of relay 17. However, there is a charging path for capacitor 289 through coil 1 of relay 272 which prevents the latter from operating until the capacitor is charged. When the above-mentioned ground is applied, the capacitor will commence to charge. The charging current through coil 1 neutralizes the operating current through coil 2 because these coils are wound in opposition. Relay 272 will begin to operate when the charging current begins to level off. As it does so, the ground is removed by the opening of the break contact of relay 272. When the discharge current ceases, this relay will release and the operating circuit is reestablished to cause the cycle to begin again. Relay 272 is therefore a pulsing relay and its contacts complete a circuit to cause indicating lamp 253 to flash. This circuit goes from positive battery through indicating lamp 253, wire 291, make contacts of relay 278, wire 292, to break contacts of the pulsing relay 272. If the master operator wishes to add more outstations to the selection, it is only necessary that the call button of each of the additional stations be operated. It is possible for the operator to eliminate an outstation after it is selected by operating the call button and the release call button 261 simultaneously. For example, if the operator wishes to release outstation No. 2 after having selected this station, he will depress call button 251 and the release call button 261. The holding circuit for relay 278 associated with outstation No. 2 is completed through break contacts of the call button which transfers the coil from the operating ground to a holding ground. The holding ground is supplied by the operated relay 17 through a make contact on the operated relay 278, through the release call button break contact and back to the coil of relay 278. When the release call button and the call button are operated together, the operating ground as well as the holding ground are removed and the select relay 278 will release.

Figure 8:
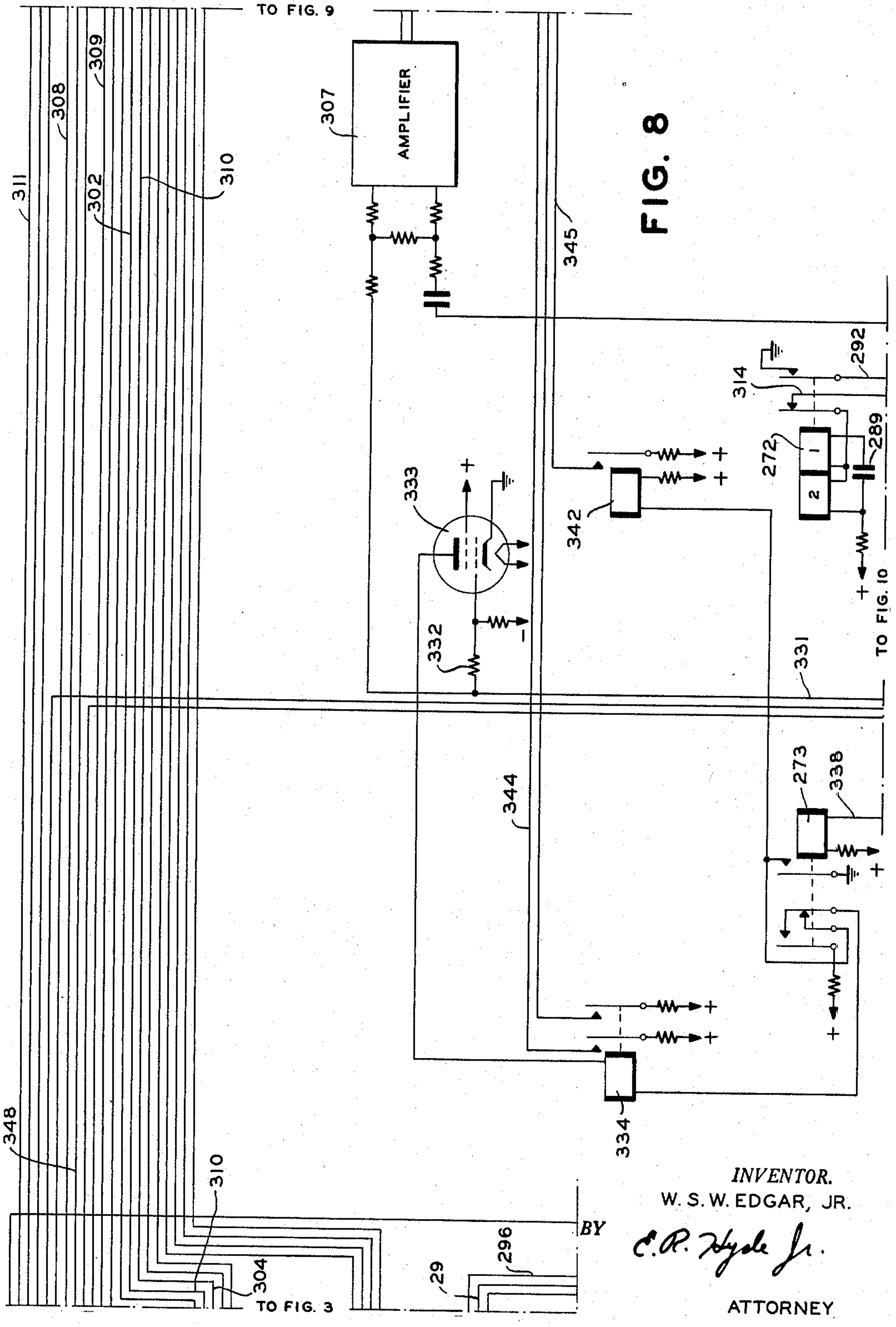

When relay 17 operated, control of the switching equipment was transferred to the master station. The shield grid of step tube 21 (Fig. 4) was connected to the select relays by wire 292, break contacts of relay 19, wire 18 (Figs. 4, 10), transfer contacts of relay 17, wire 294 (Figs. 10, 11) to a make contact of each of the select relays (Fig. 9). The control grid of stop tube 28 was transferred from level J to level K of the director switch over wire 33 (Fig. 4), break contact of relay 19, wire 32 (Figs. 4, 10), transfer contacts of relay 17, wire 296, to the arm of the K level (Fig. 3). At this point the upper row of lights on the control panel (Fig. 11) are flashing in accordance with each of the outstations selected. If the operator is satisfied with the selection, he presses start button 262 which closes a circuit from positive battery at relay 269 (Fig. 10), the coil of this relay, wire 297 (Figs. 10, 11), the contacts of the start button, wire 298, to ground through make contacts of relay 264 (Fig. 10). Relay 269 will energize and short the contacts of the start button through a pair of make contacts, thereby causing this relay to lock up. Another pair of make contacts of relay 269 will apply positive battery over wire 299 to a pair of contacts of each of the select relays (Fig. 9); for outstation No. 3, this positive battery being applied to contacts of select relay 278 over wires 300 and 301. One of these contacts of each select relay 278 will apply positive battery to the shield grid of step tube 21, over wire 293, wire 294 (Figs. 11, 10), transfer contacts of relay 17, wire 18, and wire 292 (Fig. 4). The other contact on each select relay will apply positive battery to the proper stud of the K level of director switch 25. In the case of outstation No. 2, this positive battery may be traced from wire 301, make contacts of select relay 278, wire 302 (Figs. 9, 8), to stud 13 (Fig. 3) of the K level. Similarly, the select relay of outstation No. 3 will apply positive battery to stud 14 of the K level. With positive battery applied to the step tube 21, the director switch will commence to step from one stud to another in the usual manner until positive battery is found on a stud of the K level. In this case when the positive battery is found on stud 13, the stop tube will fire again causing the director switch to take one more step and stop. When stop tube 28 fires, relay 35 will energize causing relay 19 to operate to remove the positive battery from the shield grid of the stepping tube.

It is recalled from the description of a connection from one transceiver outstation to another that relay 71 (Fig. 3) operates if the called station is not busy and in condition to receive. Similarly for a master transmission, relay 71 will energize if outstation No. 2 is not in a busy condition. When this relay operates, positive battery is applied through a make contact, wire 95, the arm of level A of the director switch, stud 14, wire 304 (Figs. 3, 8, 9) through coil 1 of connect relay 281 to ground. The connect relay will operate and lock by negative battery applied through a make contact to the 2 coil of the connect relay 281, wire 305, wire 306 (Figs. 9, 11), at break contact of the call button of station 2, wire 303 (Figs. 9, 10), a make contact of relay 264 to ground.

The operation of connect relay 281 (Fig. 9) releases the corresponding select relay 278 and applies a supplementary holding ground to the previously operated relay 273. The lines of outstation No. 2 are now connected to the lines of the master transceiver. Lines L6 and L7 (Fig. 11) of the master transceiver may be traced through closed make contacts of relay 269 (Fig. 10) to the input of amplifier 307 (Fig. 8). The output of the amplifiier connects through make contacts of energized connect relay 281 (Fig. 9) to wires 308 and 309 (Figs. 9, 8, 2,) to lines L2 and L1, respectively, of outstation No. 2.

The busy multiple of patron No. 2 is grounded by a make contact on the operated connect relay 281 to wire 311. With ground thus applied to the busy multiple of outstation No. 2, the equipment at that station is busied and a call to outstation No. 2 by any other outstation will result in a busy signal at the calling outstation. The same ground is applied to another make contact of connect relay 281 to cause lamp 253 to cease flashing. This circuit may be traced from positive battery through lamp 253 (Fig. 11), wire 291, a break contact of relay 312 (Fig. 9), wire 314' to ground through a make contact on relay 281.

After this connection is made and the common control switching equipment releases causing relay 19 (Fig. 4) to release, positive battery is reapplied to the shield grid of stepping tube 21. The director switch will immediately begin to step again until positive battery is found on another stud of the K level. Since outstation No. 3 is a selected station in the example chosen, positive battery will be found on stud 14 resulting in the firing of stop tube 228. The director switch 25 will make one more step and stop on the stud 15 corresponding to outstation No. 3. If this station is idle, connection will be made similarly to the connection to station 2.

The primary function of relay 19 is to open the calling multiple after the director switch stops. This disconnects positive battery put out by other select relays from the shield grid of the step tube and allows the director switch to remain at rest while a station is being connected. After a connection is made, the director switch must find another selected station. The release of the relay 19 places any waiting positive battery on the calling multiple of the shield grid of step tube 21 which will refire to step the selector switch to the next selected outstation stud.

It is seen that in master transmission the operation of the common switching equipment is the same as in making a connection from one outstation to another. It is recalled that if an outstation is busy, relay 73 operates rather than relay 71, as in the case when the outstation is in idle condition. Operation of relay 73 puts negative battery out to the calling station, and in the case of master transmission this negative battery serves to energize the busy relay in the master equipment corresponding to the station being called. For example, if station 2 were in a busy condition, relay 73 (Fig. 3) would energize and negative battery would be applied through a pair of make contacts, wire 77, level B of the director switch, stud 14, wire 310 (Figs. 3, 8, 9), the coil of busy relay 283, wire 313, contacts of the release busy switch 259 (Fig. 11) to ground. The busy relay 283 corresponding to outstation No. 2 will operate and lock to a local negative battery through its own make contact, wire 282, and a break contact of relay 281. The operation of relay 283 places a ground at the coil of the pulsing relay 272 (Fig. 8) through a pair of make contacts of relay 283, wire 315 (Figs. 9, 11), wire 316 (Figs. 11, 10), wire 314 (Figs. 10, 8), and a break contact of relay 272. This is a supplementary ground to maintain relay 272 pulsing after relay 17 releases. A circuit is thereby completed to cause the busy selected outstation busy lamp 254 to flash. This circuit is from positive battery through lamp 254 (Fig. 11), wire 331 (Figs. 11, 9), break contacts of the unoperated relay 312 make contacts of busy relay 283, wire 318 (Figs. 9, 11), wire 292 (Figs. 11, 10), to the pulsing contacts of relay 272 (Fig. 8).

As the director switch finds a selected station in a busy condition, therefore, the master station operator is notified by the flashing condition of the bottom indicating lamp of that particular station. When the busy relay 283 operated, it opened the holding circuit of select relay 278 which releases and opens the circuit of the top indicating lamp 253. Consequently the flashing light is switched from the top indicating lamp to the bottom one.

*Group selection*

Figure 11:
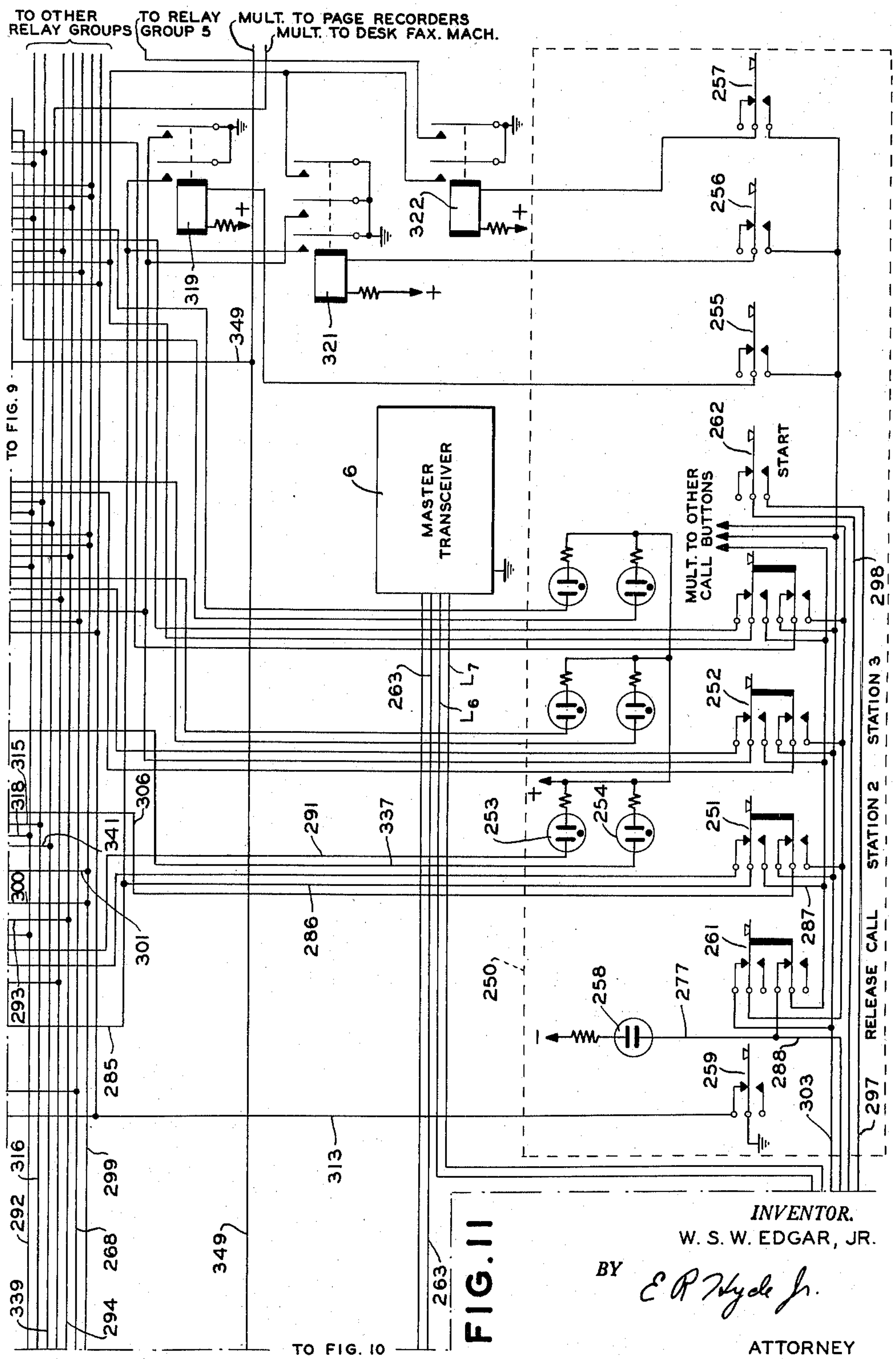

An alternative method of calling outstations is provided by group selection buttons 255, 256 and 257. The communication requirements of a subscriber company may be such that certain messages are often sent to a fixed group of stations from the master transceiver. Rather than choosing a fixed group of stations by the individual call buttons, a predetermined group of stations may be chosen to be selected by one of the group buttons. The operation of a group button such as 255 supplies an operating ground to energize a group relay 319 which closes its make contacts to energize the select relays associated with outstations 2 and 3. When the group button is released, the group relay 319 will be deenergized. However, the operated select relays lock up in the usual manner. Any predetermined number of outstations may be controlled by a particular group relay. As shown in Fig. 11, group button 256 controls a group relay 321 which is connected to energize the select relays of outstations 2, 3 and 4, the group button 257 is connected to control group relay 322 to operate the select relays of outstations 4 and 5 in a system when an outstation No. 5 is provided. After the select relays operate as a result of a group selection, connection is made in the same manner as when using the individual call buttons.

After a group has been selected, the operator may delete a station from the group by simultaneously pressing release call button 261 and the call button of the selected outstation to be deleted as previously described. A station may be added to a selected group merely by pressing the call button of the station to be added to the selection.

Figure 12:
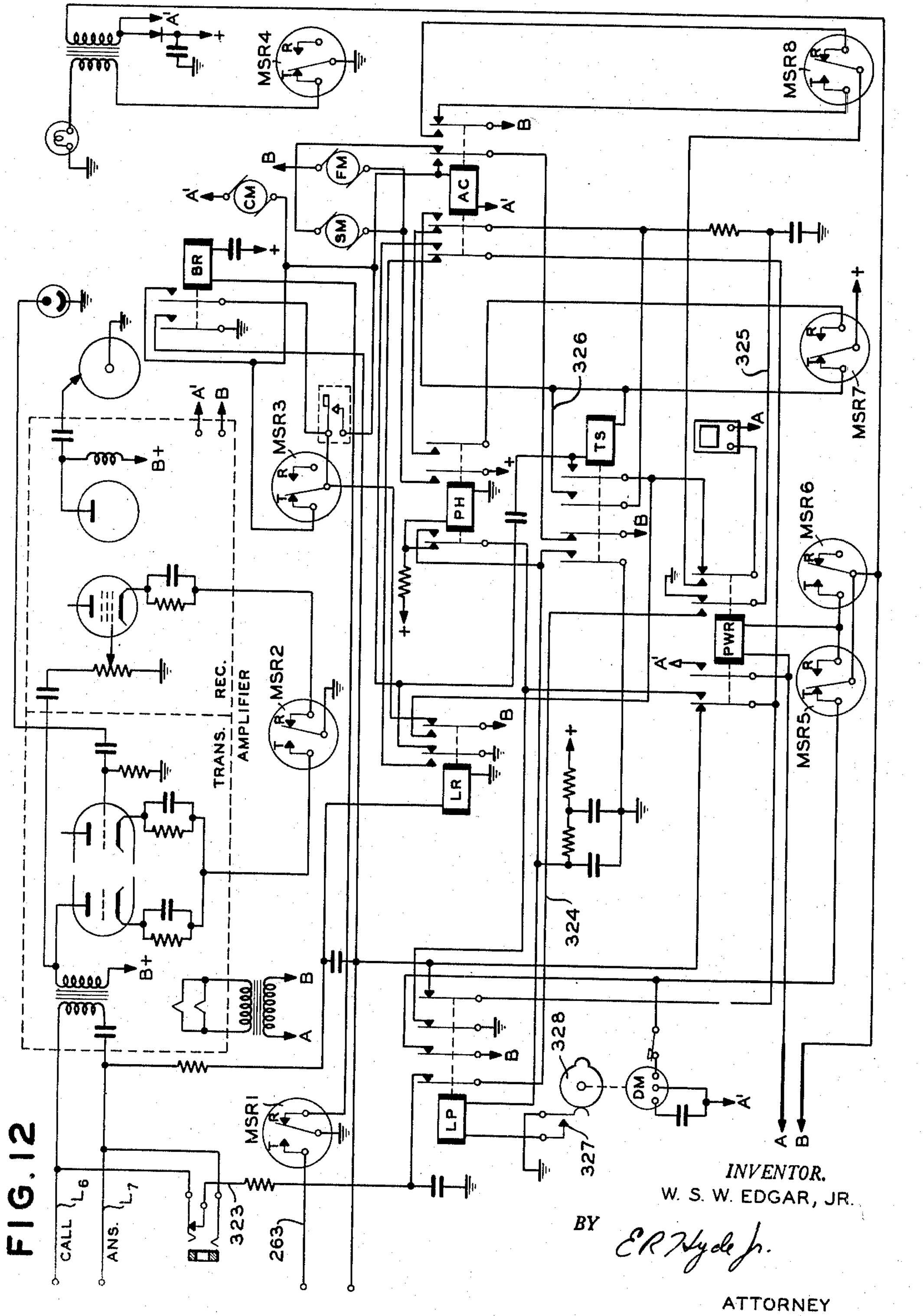
Fig. 12 is a schematic diagram of the transceiver at the master station.

Master transceiver 6 is of the type shown in the aforementioned applications of G. H. Ridings and R. J. Wise et al. modified as shown in Fig. 12. This transceiver is similar to that used at each of the outstations but does not have a dial because selection is made from the master station by means of the call buttons. After all the idle selected outstation transceivers have been connected, they are ready to phase to the sending master transceiver. The phasing operation will be described by reference to Figs. 5, 6, and 8 to 12. It is recalled that when the operator is satisfied with the selected outstations, as indicated by the flashing of the top row indicating lights, the start button 262 is pressed which serves to energize relay 269. At this time the operator has pressed the send button on the master transceiver 6 to position the switches MSR (Fig. 12) on the T contacts thereof. These switches operate in a similar manner as the send-receive switches SR at the outstation transceiver. The calling line L6 at the master transceiver (Fig. 12) has positive battery applied thereto over wire 323, a break contact of relay LP, wire 324, a make contact of power relay PWR now energized through the T contact of MSR6, wire 325, a make contact of relay TS, wire 326, and the T contact of the send switch MSR7. When the send button at the master transceiver was operated, power relay PWR energized to energize the drum motor DM by connecting line A' to bus bar A. Relay LP is periodically energized by switch 327 which is actuated by commutator 328 driven by the drum motor. It is seen therefore that the positive battery to the calling line is interrupted by pulsing relay LP.

From the calling line L6 this pulsating positive battery is applied to the control grid of a vacuum tube 333 (Fig. 8), through make contacts of relay 269 (Fig. 10), wire 329, wire 331, and resistor 332. Vacuum tube 333 is therefore caused to periodically conduct to pulse relay 334. Make contacts of the latter relay apply pulsating positive battery to the answering line of each of the connected outstations which, as shown in Figs. 5 and 6, is received over answering line L2 to operate buzzer 177. This circuit may be traced from line L2, wire 171, relay 172, wire 173, break contacts of relay 159, rectifier 175, wire 176, line relay LR to ground. When the line relay operates, a pair of make contacts connect bus bar B to buzzer 177 over wire 179, break contacts of relay PWR, and wire 178. When the buzzer sounds, the operator at the outstation will wrap a receiving blank on the transceiver drum and press the receive button which energizes power relay PWR and conditions the transceiver for phasing.

With one-to-one transmission as previously described, phasing occurs when the PH relays operate to start scanning. For master transmission where several receiving stations must phase, scanning must be delayed until the last selected outstation has phased. Only then can all the connected stations start scanning simultaneously. With master transmission although each phasing relay PH operates in the same manner as in one-to-one transmission, scanning is prevented by a gas tube 165 (Fig. 5). When the phasing relay PH operates at a transceiver outstation, positive battery is applied to the calling line at the transceiver and may be traced from calling line L1 (Figs. 5 and 6), wire 161, closed contacts of relay 159, wire 158, closed contacts of relay 157, wire 162, wire 154, break contacts of relay LP (Fig. 6), wire 153, make contacts of power relay PWR, wire 152, wire 151, break contacts of relay ACR, wire 186, make contacts of the phase relay PH, receive contacts R of the send-receive switch SR2 to positive battery. This positive battery applied to the calling line L1 is passed by wires 111 and 309 (Fig. 2) in the case of outstation No. 2 to the master transceiver through make contacts of connect relay 281 (Fig.

9), wire 336, the coil of answer relay 312 to ground. In this manner the answer relay associated with each phased outstation energizes and puts a permanent ground at the bottom indicating lamp of the outstation that has answered. Lamp 254 associated with outstation No. 2 is caused to glow steadily by means of this ground supplied through make contacts of relay 312, wire 337, to one side of the lamp. The operator at the master station by observing the steady glow of the lower row of indicating lamps is informed of the outstations that have phased and consequently answered. A break contact of each energized answer relay extinguishes the upper indicating lighted lamp associated with that particular phased outstation. The operation of the answer relay of the last outstation to answer removes a holding ground for relays 271 and 273. One side of the coil of relay 273 is connected to one side of coil 2 of 271 by wires 338 and 340 and to ground over wires 339 (Figs. 10, 11), wire 341, break contacts of answer relay 312 and make contacts of connect relay 281. Wire 339 is also grounded by each of the answer relays associated with the other outstations. This ground is not removed until the answer relay of the last connected outstation is energized. The release of relay 271 places steady positive battery on the control grid of tube 333 which may be traced through a pair of make contacts of relay 264 (Fig. 10), wire 350, break contacts of relay 271, and wire 331. The tube immediately starts to conduct, resulting in the operation of relays 334 and 342 (Fig. 8) which are connected in series in the plate circuit of the tube. Another break contact of relay 271 connects positive battery over wire 343, make contacts of relay 269 to the answering line L7 of the master transceiver. When relay 334 operates as a result of tube 333 firing, positive battery is applied over wire 344 (Figs. 8, 9), make contacts of connect relay 281, to the answering line of the selected outstation No. 2. This positive battery results in the energization of relay 172 (Figs. 5, 6) at outstation No. 2 which opens its break contacts permitting tube 165 to fire. When the tubes 165 at each outstation conduct, their respective relays 183 will operate to close a pair of make contacts which energizes the feed and stylus motors to cause scanning to start. Since the positive battery from relay 334 at the master station to the line is applied simultaneously, the tubes 165 at each outstation will commence conducting at the same time, causing all connected stations to start scanning simultaneously.

As the scanning drum of the master transceiver reaches the end of its travel after covering the width of a message sheet, it operates a stop switch, as fully explained in the above-mentioned applications of Wise et al. and Ridings. The power relay PWR at the master transceiver is thereby deenergized to restore the transceiver to the idle condition. Ground is removed from wire 263 and relay 264 is released, thereby releasing all of the common relays in the master switching system. As the scanning drum of each operated transceiver similarly actuates its stop switch to shut down the transceiver at the outstations, positive battery is removed from the various answering lines to deenergize the answer relays (such as relay 312 for station 2) at the master station. Each released answer relay thereupon releases the associated connect relay (281 for station 2) by opening the holding circuit thereof. The release of the answer relays extinguishes the lower indicating lights associated therewith and the equipment at the master station is then in the normal idle condition.

It has been seen how the master station phases with a plurality of transceiver outstations, such as stations 2 and 3. In the event that one of the selected outstations is a receiving-only station, the phasing operation is modified because the page recorder starts and stops automatically and phases differently from the rtansceivers. Referring to the page recorder circuit of Fig. 7, it is recalled that relay 198 follows the phasing pulses received over answering line L9. The first time relay 198 pulls up, it energizes relays 199 and 201 which will thereupon remain operated and release relay 212. The first time that relay 198 releases after relay 212 has released, phasing relay PH energizes to operate phase magnet PM. Operation of the latter causes the recorder to commence scanning. Since scanning starts when the recorder phases, phasing at this outstation must be delayed until all of the connected transceivers phase.

When the operator at the master station presses the send button, ground is supplied over line 263 to operate relay 264 (Fig. 10) which closes a make contact to apply positive potential to the grid of tube 333. The tube thereupon conducts and relays 334 and 342 operate. Relay 17 also operates from positive battery at the contacts of relay 35 (Fig. 3), wire 265, relay coil 17 (Fig. 10), and contacts of relays 264 and 269 to ground. Relay 17 locks up through a pair of its make contacts and also supplies ground to relays 272 and 273 which immediately energize. Operation of relay 273 closes a make contact to maintain relay 342 energized independently of relay 334. When relay 271 operated, it opened the control grid circuit of tube 333 which becomes nonconducting. As a result the relay 334 releases but relay 342 remains operated through the closed make contact of relay 273.

It is recalled that the next step performed by the operator at the master station after the designated outstations have been selected is to press the start button 262. This operates relay 269 which connects the pulsating positive battery from wire L6 of the master transceiver to tube 333. Consequently relay 334 pulses to apply phasing pulses to the answer line of each connected transceiver. However, relay 342 is held operated by the closed make contacts of 273. While the transceiver outstations and master transceiver are phasing, relay 342 applies steady positive battery over the answer lines of the connected receiver-only stations. In the case of station 4, this positive battery may be traced from a make contact of relay 342, wire 345, closed make contacts of the connect relay 347 (Fig. 9) associated with station 4, wire 348, answer line L9 (Fig. 7), the coil of relay 198 to ground. The latter relay is therefore held operated and phasing at receiver only station 4 is prevented at this time. In addition, connect relay 347 closed a make contact which applies ground through closed break contacts of relay 351 to multiple 349 (Figs. 9, 11, 10) to energize the 1 coil of relay 271.

It was stated above in considering a call from the master station to stations 2 and 3 that relays 271 and 273 release due to the removal of ground from wire 339 by operation of the answer relay of the last connected outstation to answer. However, in making a call that includes outstation 4, relay 273 releases in the usual manner but relay 271 remains operated due to the energization of the 1 coil by the operated connect relay 347. When relay 273 releases (Fig. 8), it opens the holding circuit of relay 342 which releases and removes positive battery from the answering line of outstation No. 4. Relay 198 (Fig. 7) thereupon releases and the receiving-only station phases. Positive battery is put on the answering line by operation of phase relay PM at outstation No. 4 to energize answer relay 351 (Fig. 9) which opens a break contact to remove ground from the 2 coil of relay 271. The subsequent operation of the equipment is the same as that described above in regard to master sending to stations 2 and 3.

*Connection with outside system*

It has been mentioned that provision is made to connect the subscriber companies' facsimile system with an outside telegraph system such as that maintained by the Western Union Telegraph Company. Referring again to Fig. 1 there is shown a facsimile tranmitter 11 at a central office of the outside system connecting with a page recorder 9 located at the master station of the subscriber's system. Transmitter 11 may be of the type shown in U.S. Patent No. 2,657,259 to Hackenberg, and the page recorder 9 may be of the type disclosed in the aforementioned Hallden et al. patent. These machines may be connected for one-to-one transmission as shown schematically in Fig. 1, or they may be connected through conventional switching equipment located at the central office. Since the details of transmitter 11 and recorder 9 form no part of the present invention and the means for connecting them would be well known to a facsimile engineer, a detailed description thereof is unnecessary.

When a telegram is received at the central office and destined for one of the stations in the subscriber's system, it is placed in transmitter 11 and transmitted to the master station where it is received by recorder 9. If the addressee is located at the master station, the received copy can be immediately delivered, but if the addressee is located at one of the outstations, the telegram is relayed. For this purpose, a facsimile transmitter 8 is provided which is of the type shown in the above-mentioned Hackenberg patent modified with a dial unit as hereinafter described. The telegram to be relayed is taken from recorder 9 and placed in transmitter 8. Then by dialing the number of the addressee outstation the message is relayed to its proper destination.

Figure 13:
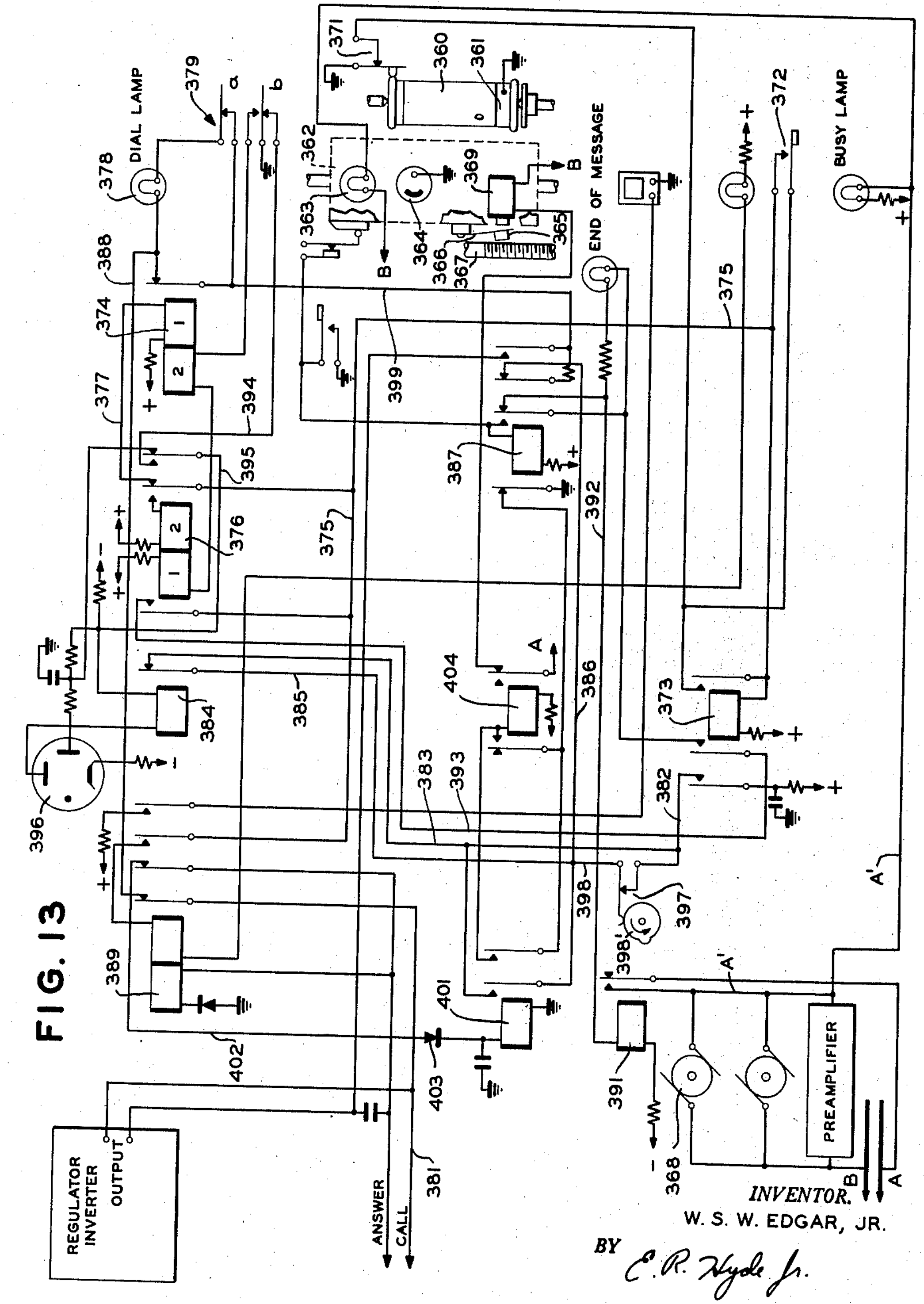
Fig. 13 is a schematic diagram of the transmitter at the central office of an outside system that connects with the subscriber's system of the present invention.

For the purpose of the present specification there is indicated by schematic symbols in Fig. 13 only such parts of transmitter 8 as are necessary to describe the transmitting and dialing circuits of the system. For the details of construction, reference may be had to the Hackenberg patent. This machine is of the well known type wherein the message sheet 360 is mounted on a vertically mounted rotatable drum 361. A vertically slidable scanning carriage 362 carries an exciter lamp 363 and a photocell 364, the operation of which in facsimile work is well understood. The carriage has a half-nut 365 mounted on a spring 366 which normally holds the half-nut in engagement with a rotary feed screw 367. A synchronous motor 368 drives both the drum 360 and the feed screw 367 at their respective speeds. A solenoid 369 is adapted to hold the half-nut away from the feed screw when energized.

In transmitting from this machine, the message is wrapped around drum 360 which is placed in the transmitter. When the drum is in position it closes switch 371 which applies ground to one side of start button 372. When the start button is operated, it energizes relay 373 which energizes and locks through a pair of make contacts. Relay 374 is also operated by a circuit from ground at switch 371, closed contacts of relay 373, wire 375, break contacts of deenergized relay 376, wire 377, the 1 coil of relay 374 to positive battery. The break contacts of relay 374 are thereupon opened to remove a short across dial lamp 378 and the dial contacts *a* of dial 379. Positive battery is applied to the calling line 381 through closed make contacts of relay 373, wires 382 and 383, break contacts of relay 384, wire 385, wire 386, break contacts of relay 387, wire 399, the dial contacts *a* of dial 379, lamp 378, wire 388 and break contacts of relay 389.

With positive battery on the calling line of transmitter 8, the common control equipment will function in the same manner as described above in making a call from outstation 2 to outstation 3. This operation will be briefly summarized by referring to Figs. 2 to 4 wherein transmitter 8 is shown in block form with its associated switching circuits. Positive battery on wire 381 is applied over wire 16 to the screen grid of step tube 21 and also to stud 20 of the J lever of director switch 25. The director switch will accordingly step until the arm of the J level finds positive battery on stud 20 at which time stop tube 28 will fire causing the switch to take one more step to stud 1 and stop. Conduction of the stop tube also energizes relay 35 which removes a ground from one side of relay 19 permitting the latter to energize to apply ground to wire 18 which may be traced back to the calling line of transmitter 8. Thus the circuit including dial lamp 378 is completed when the director switch is positioned on the stud corresponding to the calling transmitter. The dial lamp lights. The operator then dials the number corresponding to the outstation for which the message is destined. When dialing starts, the off normal contacts "*b*" operate to apply ground to the series combination of the 1 coil of relay 376 and the 2 coil of relay 374. Relay 376 locks up through the 2 coil and a pair of make contacts. Relay 391 is thereupon energized by negative battery, relay coil 391, wire 392, closed break contacts of relay 387, make contacts of energized relay 373, wire 393 make contacts of relay 376, wire 375, make contacts of relay 373 and switch 371 to ground. The operated relay 391 connects bus bar A to line A' to energize various components of the transmitter to place it in condition for scanning.

When the operator releases dial 379, the pulsating contacts thereof interrupt the positive battery on the calling line to make connection with the called station. The connection is made in the same manner as previously described in the case of a call from outstation 2 to outstation 3.

With the connection made between transmitter 8 and the called station the machines automatically phase. The phasing is similar to that above described in regard to a call between a pair of outstations. The positive battery applied to the calling line of transmitter 8 (Fig. 12) is received on the answering line of the connected outstation (Figs. 5 and 6), to energize the line relay LR which closes a pair of make contacts to complete the energizing circuit of buzzer 177. The operator at the outstation will thereupon place a receiving blank on the transmission drum and operate the receive button which energizes the power relay PWR to condition the machine for receiving.

At transmitter 8, the off normal contacts "*b*" of dial 379 have returned to the position shown in Fig. 13. With relay 376 now locked in the operated position, ground is applied through the off normal contacts, wire 394, make contact of relay 376 and wire 395 to the starter anode and plate circuit of gas tube 396. The tube will thereupon fire and operate relay 384 which opens its break contacts to remove a short around phasing contacts 397. These contacts are intermittently operated at synchronous speed by a commutator 398' fixed to the shaft of drum motor 368. With the short removed from these contacts, synchronous phasing pulses are applied to the calling line 381 from positive battery at a pair of make contacts of relay 373, wire 382, phasing contacts 397, wire 398, wire 386, break contacts of unoperated relay 387, wire 399, break contacts of unoperated relay 374, wire 388, break contacts of unoperated relay 389 to the calling line 381.

The phasing pulses from the transmitter are received on the answering line of the connected outstation and applied to line relay LR (Figs. 5, 6) which will pulse at a synchronous rate. Drum motor DM at the outstation was energized when power relay PWR operated and commutator 181 was thereby rotated to intermittently operate contacts 182 which in turn cause relay LP to pulse. Break contacts of relay LP operate to open the energizing circuit of the drum motor with each revolution of the commutator 181. It is recalled that this arrangement causes the drum motor to operate at less than synchronous speed. The situation therefore exists wherein relay LR pulses synchronously under the control of the drum motor at the transmitter and relay LP pulses at a subsynchronous speed under control of the outstation drum motor. In a short time, these relays get in step where relay LR is deenergized and relay LP is operated. At this time each removes a ground from one side of phase relay PH which operates and opens a break contact so that it is no longer under the control of relays LR and LP. Operation of the phase relay performs a number of functions. Its make transfer contact applies ground to relay LP to prevent further operation thereof so that the drum motor energizing circuit is no longer interrupted and the motor runs at synchronous speed. A make contact of the phase relay applies positive battery to the starter anode of gas tube 165 which fires to operate relay 183. A make contact of relay 183 connects line A' to one side of the stylus motor SM and feed motor FM to start scanning. At the same time, phase relay PH closes another make contact to apply steady positive battery to the calling line which is received over the answering line at transmitter 8 (Fig. 13) and applied to relay 401, through break contacts of the unoperated busy relay 389, wire 402 and rectifier 403. Operation of relay 401 shorts phasing contacts 397 and closes an energizing circuit for relay 404 which releases the normally energized half-nut solenoid 369. With the phasing contacts shorted, steady positive battery is sent out over the calling line 381 and received on the answering line at the outstation. Relay 172 thereupon energizes to permit tube 334 to fire and scanning begins.

Referring again to Fig. 1, it is seen that a recorder 12 is located at the central office of the outside telegraph system. This recorder connects to the common control equipment of the subscriber companies' system so that any transceiver outstation such as stations 2 and 3 can obtain a direct connection to the central office. Recorder 12 is the same type of machine as recorder 4 and transmission to the central office is therefore the same as the case of a transceiver outstation sending to receiving only station 4 described above.

Though the present invention has been described with respect to a specific embodiment thereof, it is understood that this is not to be considered as limiting the invention as defined in the following claims.

What is claimed is:

1. In a facsimile telegraph system of the character described, a plurality of facsimile transceivers, each of said transceivers being adapted to be manually set up as a transmitter to send messages, common switching equipment whereby any pair of said transceivers may be selectively connected, means connecting each of said transceivers to the common switching equipment, said transceivers including manually controlled impulse producing means, said switching equipment including connecting switch means associated with each of said transceivers, a common rotary director switch having a plurality of positions corresponding to said plurality of transceivers, means at each transceiver to send a calling signal upon setting up the transceiver as a transmitter means responsive to a calling signal from a transceiver to step said director switch, means to stop said director switch at a position corresponding to the calling transceiver, means responsive to said last-named means to step the connecting switch means associated with the calling transceiver to a home position, first relay means connected to said director switch, said first relay means being responsive to electrical pulses from said impulse producing means at a calling transceiver to step said connecting switch means associated therewith to a position corresponding to a called transceiver and second relay means controlled by said first relay means to interconnect a calling transceiver and a called transceiver.

2. In a facsimile telegraph system of the character described, a plurality of facsimile transceivers, each of said transceivers being adapted to be set up as a transmitter to send messages, common switching equipment whereby any pair of said transceivers may be selectively connected, means connecting each of said transceivers to the common switching equipment, said transceivers including manually controlled impulse producing means, said switching equipment including connectnig switch means associated with each of said transceivers, a common rotary director switch having a plurality of positions corresponding to said plurality of transceivers, means responsive to a calling signal from a transceiver to step said director switch, means to stop said director switch at a position corresponding to the calling transsceiver, first relay means connected to said director switch, said first relay means being responsive to electrical pulses from said impulse producing means at a calling transceiver to step said connecting switch means associated therewith to a position corresponding to a called transceiver, first busy detection means to test the called transceiver for a busy condition, second relay means energized by said first busy detection means upon detection of a busy condition, second busy detection means to test the called transceiver for a busy condition arising after the positioning of said director switch, means whereby siad second busy detection means energizes said second relay means upon detection of a busy condition, busy indicating means at each of said transceivers, means whereby energization of said second relay means operates the busy indicating means at a calling transceiver, and third relay means operable to interconnect a calling transceiver with a called transceiver.

3. In a facsimile telegraph system of the character described, a plurality of facsimile transceivers, each of said transceivers being adapted to be set up as a transmitter to send messages, common switching equipment whereby any pair of said transceivers may be selectively connected, means connecting each of said transceivers to the common switching equipment, said transceivers including manually controlled impulse producing means, said switching equipment including connecting switch means associated with each of said transceivers, a common rotary director switch having a plurality of positions corresponding to said plurality of transceivers, means responsive to a calling signal from a transceiver to step said director switch, means to stop said director switch at a position corresponding to the calling transceiver, means responsive to said last-named means to step the connecting switch means associated with the calling transceiver to a home position, first relay means connected to said director switch, said first relay means being responsive to electrical pulses from said impulse producing means at a calling transceiver to step said connecting switch means associated therewith to a position corresponding to a called transceiver, first busy detection means to test the called transceiver for a busy condition, second relay means energized by said first busy detection means upon detection of a busy condition, second busy detection means to test the called transceiver for a busy condition arising after the positioning of said director switch, means whereby said second busy detection means energizes said second relay means upon detection of a busy condition, busy indicating means at each of said transceivers, means whereby energization of said second relay means operates the busy indicating means at a calling transceiver, and third relay means operable to interconnect a calling transceiver with a called transceiver.

4. In a facsimile telegraph system of the character described, a plurality of rotary drum facsimile transceivers adapted to be set up as transmitters to send facsimile messages and as receivers ot receive facsimile messages, each of said transceivers having means to send a signal to initiate a call and manually operable means to send predetermined combinations of impulses to select a called transceiver, phasing means whereby the rotary drums of connected transceivers are brought into phase alignment switching means, means connecting each of said transceivers to said switching means, said switching means including a rotary switch having a plurality of contacts corresponding to the plurality of transceivers, means responsive to said signal from a calling transceiver to step the rotary switch, stopping means operable to stop the rotary switch at a position corresponding to a calling transceiver, first relay means controlled by said stopping means, second relay means responsive to a busy condition of a called transceiver, third relay means operable to connect a calling transceiver and a called transceiver determined by a combination of impulses from the calling transceiver, a control tube, means to bias said control tube to conduction a predetermined period of time after energization of said second relay means, means to bias said control tube to conduction a predetermined period of time after energization of said third relay means whereby energization of either said second or third relay means responsive to conduction of the control tube to restore the switching means to normal standby condition.

5. In a facsimile telegraph system of the character described, a plurality of facsimile transceivers adapted to be set up as transmitters to send facsimile messages and as receivers to receive facsimile messages, each of said transceivers having means to send a steady signal to initiate a call and manually operable means to interrupt said steady signal to send predetermined combinations of impulses to select a called transceiver, phasing means to interrupt said steady signal upon operative connection of a pair of transceivers switching means, means connecting each of said transceivers to said switching means, said switching means including a rotary switch having a plurality of contacts corresponding to the plurality of transceivers, means responsive to said signal from a calling transceiver to step the rotary switch, stopping means operable to stop the rotary switch at a position corresponding to a calling transceiver, first relay means controlled by said stopping means, second relay means rseponsive to a busy condition of a called transceiver, third relay means operable to connect a calling transceiver and a called transceiver determined by a combination of impulses from the calling transceiver, a first electronic device, means to bias said first electronic device to conduction a predetermined period of time after energization of said second relay means, means to bias said first electronic devices to conduction a predetermined period of time after energization of said third relay means, means responsive to conduction of the first electronic device to restore the switching means to normal condition, a second electronic device, means to bias said second electronic device to conduction a predetermined period of time after energization of said first relay means, and means responsive to conduction of the electronic device to energize said second relay means.

6. In a facsimile telegraph system wherein a plurality of facsimile transceivers are each located at an outstation, switching mechanism to selectively interconnect any pair of said plurality of transceivers, a communication line connecting each transceiver with the switching mechanism, each of said transceivers comprising transmitting means to send facsimile messages, receiving means to record facsimile messages, sending switching means to set up the transceiver as a transmitter, receiving switch means to set up the transceiver as a receiver, phasing means whereby two interconnected transceivers are phased, a manually operable dial unit including a pair of dial contacts, relay means normally connected in parallel across said dial contacts, means controlled by said sending switch means to operate said relay means whereby the connection across said dial contacts is opened when the transceiver is set up as a transmitter and other means controlled by said sending switch to connect said dial contacts in series between a source of potential and the communication line whereby operation of the contacts results in electrical impulses applied to said line.

7. In a facsimile telegraph system wherein a plurality of fascimile transceivers are each located at an outstation, switching mechanism to selectively interconnect any pair of said plurality of transceivers, a communication line connecting each transceiver with the switching mechanism, each of said transceivers comprising transmitting means to send facsimile messages, receiving means to record facsimile messages, sending switch means to set up the transceiver as a transmitter, receiving switch means to set up the transceiver as a receiver, phasing means whereby two interconnected transceivers are phased, a manually operable dial unit including a pair of dial contacts, indicating means connected to said dial unit, relay means normally connected in parallel across said dial contacts and indicating means, means controlled by said sending switch means to operate said relay means whereby the connection across said dial contacts and indicating means is opened when the transceiver is set up as a transmitter and other means controlled by said sending switch to connect said dial contacts and indicating means in series between a source of potential and the communication line whereby operation of the contacts results in electrical impulses applied to said line.

8. In a facsimile telegraph system wherein a plurality of facsimile transceivers are each located at an outstation, switching mechanism to selectively interconnect any pair of said plurality of transceivers, a communication line connecting each transceiver with the switching mechanism, each of said transceivers comprising transmitting means to send facsimile messages, receiving means to record facsimile messages, sending switch means to set up the transceiver as a transmitter, receiving switch means to set up the transceiver as a receiver, phasing means whereby two interconnected transceivers are phased, a manually operable dial unit including a pair of dial contacts, relay means normally connected in parallel across said dial contacts, means controlled by said sending switch means to operate said relay means whereby the connection across said dial contacts is opened when the transceiver is set up as a transmitter, other means controlled by said sending switch to connect said dial contacts in series between a source of potential and the communication line whereby operation of the contacts results in electrical impulses applied to said line, busy condition indicating means and means whereby a special signal received over said communication line operates said indicating means.

9. A facsimile telegraph system having a master station and a plurality of outstations, a facsimile transceiver located at each of said outstations, each of said transceivers being adapted to be set up as a transmitter to send facsimile messages and as a reeciver to receive facsimile messages, common switching equipment, means connecting each of said transceivers to the common switching equipment, said comon switching equipment including a multicontact rotary director switch having a plurality of positions corresponding to the plurality of transceivers, means to step the director switch, means to stop the director switch at selected positions, said master station having a master transceiver and master switching equipment, said master transceiver having means to initiate a call, said master switching equipment including relay means and a call switch corresponding to each of the transceiver outstations, means responsive to the initiation of a call by said master transceiver whereby the master equipment is operably connected to said common switching equipment, means responsive to operation of each call switch to operate the corresponding relay means, means to indicate the outstation associated with each operated call switch, means responsive to operation of said relay means to operate the director switch stepping means, other means responsive to energization of said relay means to apply a stopping potential to the director switch, means responsive to an idle condition of a called transceiver to further operate said relay means, means responsive to said further operation of said relay means to interconnect the corresponding transceiver and the master transceiver and means to initiate scanning of said master transceiver and each connected outstation transceiver simultaneously.

10. A facsimile telegraph system having a master station and a plurality of outstations, a facsimile transceiver located at each of said outstations, each of said transceivers being adapted to be set up as a transmitter to send facsimile messages and as a reecıver to receive facsimile messages, common switching equipment, means connecting each of said transceivers to the common switch'ng equipment, said common switching equipment including a multicontact rotary director switch having a plurality of positions corresponding to the plurality of transceivers, means to step the director switch, means to stop the director switch at selected positions, said master station having a master transceiver and master switching equipment, said master transceiver having means to initiate a call, said master switching equipment including relay means and a call switch corresponding to each of the transceiver outstations, means responsive to the initiation of a call by said master transceiver whereby the master equipment is operably connected to said common switching equipment, means responsive to operation of each call switch to operate the corresponding relay means, means to indicate the outstation associated with each operated call switch, means responsive to operation of said relay means to operate the director switch stepping means, other means responsive to energization of said relay means to apply a stopping potential to the director switch, means responsive to an idle condition of a called transceiver to further operate said relay means, means responsive to said further operation of said relay means to interconnect the corresponding transceiver and the master transceiver, each of said outstation transceivers having phasing means including a phasing relay, means responsive to energization of a phasing relay to actuate the corresponding relay means at the master station, an electron discharge means to control scanning at each transceiver, and means controlled by said plurality of relay means, at the master station to simultaneously fire the electron discharge device at each called outstation to simultaneously initiate scanning of the master transceiver and each connected outstation transceiver.

11. A facsimile telegraph system having a master station and a plurality of outstations, a facsimile transceiver located at each of said outstations, each of said transceivers being adapted to be set up as a transmitter to send facsimile messages and as a receiver to receive facsimile messages, common switching equipment, means connecting each of said transceivers to the common switching equipment, said common switching equipment including a multicontact rotary director switch having a plurality of positions corresponding to the plurality of transceivers, means to step the director switch, means to stop the director switch at selected positions, said master station having a master transceiver and master switching equipment, said master transceiver having means to initiate a call, said master switching equipment including relay means and a call switch associated with each of the transceiver outstations, said relay means including select relay means, busy relay means, connect relay means and answer relay means, means responsive to the initiation of a call by said master transceiver whereby the master equipment is operably connected to said common switching equipment, means to indicate idle condition of said director switch, means responsive to operation of each call switch to energize the associated select relay, means to indicate the outstation associated with each operated call switch, means responsive to energization of said select relay to operate the director switch stepping means, other means responsive to energization of said select relay to apply a stopping potential to the director switch, said common switching equipment including means to test a called outstation for a busy condition, means responsive to said last named means to energize the busy relay of the associated outstation, means responsive to energization of said busy relay to indicate a busy condition of the associated outstation, means responsive to an idle condition of a called transceiver to energize said connect relay, means responsive to operation of each of said connect relays to interconnect the associated transceiver and the master transceiver.

12. A facsimile telegraph system having a master station and a plurality of outstations, a facsimile transceiver located at each of said outstations, each of said transceivers being adapted to be set up as a transmitter to send facsimile messages and as a receiver to receive facsimile messages, common switching equipment, means connecting each of said transceivers to the common switching equipment, said common switching equipment including a multicontact rotary director switch having a plurality of positions corresponding to the plurality of transceivers, means to step the director switch, means to stop the director switch at selected positions, said master station having a master transceiver and master switching equipment, said master transceiver having means to initiate a call, said master switching equipment including relay means and a call switch corresponding to each of the transceiver outstations, said relay means including select relay means, busy relay means, connect relay means and answer relay means, means responsive to the initiation of a call by said master transceiver whereby the master equipment is operably connected to said common switching equipment, means responsive to operation of each call switch to energize the corresponding select relay, means to indicate the outstation corresponding to each operated call switch, means responsive to energization of said select relay to operate the director switch stepping means, other means responsive to energization of said select relay to apply a stopping potential to the director switch, means responsive to an idle condition of a called transceiver to energize said connect relay, means responsive to operation of said connect relay to interconnect the corresponding transceiver and the master transceiver, each of said outstation transceivers having phasing means including a phasing relay, means responsive to energization of a phasing relay to energize the corresponding answer relay at the master station, an electron discharge means to control scanning at each transceiver, and means controlled by said plurality of answer relays to simultaneously fire the electron discharge device at each called outstation to simultaneously initiate scanning of the master transceiver and each connected outstation transceiver.

13. A facsimile telegraph system having a master station and a plurality of outstations, a facsimile transceiver located at each of said outstations, each of said transceivers being adapted to be set up as a transmitter to send facsimile messages and as a receiver to receive facsimile messages, common switching equipment operable to selectively connect any pair of said transceivers, means connecting each of said transceivers to the common switching equipment, said common switching equipment including a multicontact rotary director switch having a plurality of positions corresponding to the plurality of transceivers, means to step the director switch, means to stop the director switch at selected positions, said master station having a master transceiver and master switching equipment, said master transceiver having means to initiate a call, said master switching equipment including relay means and a call switch associated with each of the transceiver outstations, said relay means including select relay means, busy relay means, connect relay means and answer relay means, means responsive to the initiation of a call by said master transceiver whereby the master equipment is operably connected to said common switching equipment, means to indicate idle condition of said director switch, means responsive to operation of each call switch to energize the associated select relay, means to indicate the outstation associated with each operated call switch, means responsive to energization of said select relay to operate the director switch stepping means, other means responsive to energization of said select relay to apply a stopping potential to the director switch, said common switching equipment including means to test a called outstation for a busy condition, means responsive to said last named means to energize the busy relay of the associated outstation, means responsive to energization of said busy relay to indicate a busy condition of the associated outstation, means responsive to an idle condition of a called transceiver to energize said connect relay, means responsive to operation of said connect relay to interconnect the associated transceiver and the master transceiver, each of said outstation transceivers having phasing means including a phasing relay, means responsive to energization of a phasing relay to energize the associated answer relay at the master station, electron discharge means to control scanning at each transceiver, and means controlled by said plurality of answer relays to simultaneously fire the electron discharge device at each called outstation to simultaneously initiate scanning of the master transceiver and each connected outstation transceiver.

References Cited in the file of this patent

UNITED STATES PATENTS

| | | |
|---|---|---|
| 2,626,987 | Veaux | Jan. 27, 1953 |
| 2,664,459 | Oberman | Dec. 29, 1953 |
| 2,667,533 | Zenner | Jan. 26, 1954 |
| 2,673,234 | Lesigne | Mar. 23, 1954 |
| 2,735,884 | Blanton | Feb. 21, 1956 |